United States Patent
Hayashi et al.

(10) Patent No.: US 6,519,827 B1
(45) Date of Patent: Feb. 18, 2003

(54) METHOD AND APPARATUS FOR ASSEMBLING MAGNETIC TAPE CARTRIDGE

(75) Inventors: Yoichi Hayashi, Kanagawa (JP); Akira Mizuta, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/787,666

(22) PCT Filed: Sep. 21, 1999

(86) PCT No.: PCT/JP99/05162

§ 371 (c)(1),
(2), (4) Date: Mar. 21, 2001

(87) PCT Pub. No.: WO00/17879

PCT Pub. Date: Mar. 30, 2000

(30) Foreign Application Priority Data

Sep. 22, 1998 (JP) ............................................ 10-268265

(51) Int. Cl.$^7$ ................................................. B25B 11/02
(52) U.S. Cl. .............................. 29/430; 29/464; 29/467; 29/559; 29/784; 29/799; 29/806; 269/309
(58) Field of Search ........................ 29/430, 464, 467, 29/559, 784, 791, 799, 824, 806, 281.1, 281.5; 269/309

(56) References Cited

U.S. PATENT DOCUMENTS

| | | | |
|---|---|---|---|
| 4,035,899 A | | 7/1977 | Matsuda ........................ 29/773 |
| 4,127,925 A | | 12/1978 | Gaiser et al. .................. 29/430 |
| 4,168,040 A | * | 9/1979 | Gaiser et al. .................. 29/806 |
| 4,330,925 A | | 5/1982 | Kato et al. ..................... 29/464 |
| 4,674,181 A | * | 6/1987 | Hamada et al. ................ 29/799 |
| 4,783,904 A | * | 11/1988 | Kimura ........................ 29/799 |
| 5,136,778 A | * | 8/1992 | Bell et al. ..................... 29/806 |
| 5,191,694 A | | 3/1993 | Ruggiero et al. ............. 29/430 |
| 5,319,845 A | * | 6/1994 | Watanabe et al. ............. 29/799 |

FOREIGN PATENT DOCUMENTS

| | | | | |
|---|---|---|---|---|
| JP | 405111833 A1 | * | 5/1993 | .................. 29/430 |
| JP | 405185335 A1 | * | 7/1993 | .................. 29/799 |
| JP | 9-147257 | | 6/1997 | ......... G11B/23/113 |

OTHER PUBLICATIONS

International Search Report.

* cited by examiner

*Primary Examiner*—David P. Bryant
*Assistant Examiner*—Jermie E. Cozart
(74) *Attorney, Agent, or Firm*—Sughrue Mion, PLLC

(57) ABSTRACT

In the method and apparatus for assembling a magnetic tape cartridge, a plurality of assembling stations, each of which includes an assembling robot 130 for assembling the respective parts of a magnetic tape cartridge 1, respectively comprise pallet delivery mechanism 135 capable of delivering sequentially a pallet 200 on which an upper cases 2a can be placed. The pallet 200 comprises front and rear reel brake hold mechanism 210, 220 respectively capable of holding front and rear reel brakes 50, 51 against the energizing forces of brake springs 12, 13 in such a manner that the front and rear reel brakes 50, 51 retreat from the installation area of the reel 3, lid spring hold mechanism 230 capable of holding the lid engaging portion 15a of a lid spring 15 in such a manner that the lid engaging portion 15a is not in engagement with a lid 30, reel hold mechanism 240 capable of holding a reel 3 on the upper case 2a side against the energizing force of a reel spring 8, and lower case hold mechanism 250 capable of holding a lower case 2b on the upper case 2a side. Accordingly, it is possible to obtain a magnetic tape cartridge having an excellent assembling accuracy with high productivity.

4 Claims, 12 Drawing Sheets

METHOD AND APPARATUS FOR ASSEMBLING MAGNETIC TAPE CARTRIDGE

TECHNICAL FIELD

The present invention relates to method and apparatus for assembling a magnetic tape cartridge and, in particular, to method and apparatus for assembling a magnetic tape cartridge of a type that a single reel with magnetic tape wound therearound is rotatably stored in a cartridge case.

BACKGROUND ART

Conventionally, as a magnetic tape cartridge which is employed as a recording medium for use in an external storage such as a computer or the like, there is known a magnetic tape cartridge of a type that magnetic tape is wound around a single reel. This type of magnetic tape cartridge is used for data retention in a computer or the like and, since important information is stored in-the magnetic tape cartridge, the magnetic tape cartridge is .structured in such a manner that occurrence of a trouble such as jammed tape or the like can be prevented and also the unexpected draw-out of the magnetic tape can be prevented.

Here, FIG. 13 is an exploded perspective view of the above-mentioned magnetic tape cartridge which is known as DLT (digital linear tape).

Referring to the magnetic tape cartridge 1 shown in FIG. 13, magnetic tape 20 is wound around a single reel 3 consisting or a combination of an upper reel 4 and a lower reel 5 welded together by ultrasonic waves, and the single reel 3 is rotatably stored in a cartridge case 2 which comprises an upper case 2a and a lower case 2b fastened together by screws 19 or the like.

The upper reel 4 comprises a cylindrical-shaped bottomed reel hub 42 on the outer periphery of which the magnetic tape 20 can be wound, and a flange portion 93 which is projected in the radial direction of the upper reel from the outer periphery of the upper end of the reel hub 42; and, the reel hub 42 and flange portion 43 are formed of synthetic resin as a united body. And, on the outer surface of the bottom portion of the reel hub 42, there are cut and formed securing teeth serving as engaging mechanism which are used to drive and rotate the upper reel 4; and, on the outer peripheral edge of the flange portion 43, there are cut and formed restricting gears 43a with which a pair of front and rear reel brakes 50 and 51 can be meshingly engaged when restricting the rotation of the upper reel 4 while not in use. By the way, as shown in FIG. 13, the bottomed recessed portion of the reel hub 42 is opened upward.

On the other hand, the lower reel 5 is formed as a disk including in the central portion thereof an opening through which the outer surface of the bottom portion of the reel hub 42 can be inserted, and the lower reel 5 can be welded by ultrasonic waves to the upper reel 4 to thereby provide a united body.

Referring further to the reel 3 comprising the upper and lower reels 4 and 5 which are welded together in the above-mentioned manner, when assembling the reel 3 into the cartridge case 2, a bearing 6 is pressure inserted into and fixed to the bottomed recesses portion of the reel hub 42 and a spring plug 7 is further pressure inserted into and fixed to a hole formed in the central portion of the bearing 6. And, a reel spring 8, which consists of a compression coil spring mounted on the spring plug 7, energizes the reel 3 downward and holds the reel 3 in a freely rotatably manner.

Also, in order to prevent the reel 3 from rotating unexpectedly when the magnetic tape cartridge 1 is not in use, the reel 3 is secured by the front and rear reel brakes 50 and 51 which can be engaged with the restricting gears 43a by energizing forces given by brake springs 12 and 13 respectively consisting of torsion coil springs. Further, in the magnetic tape cartridge 1, in a state where the magnetic tape 20 is completely wound around the reel 3 when the magnetic tape cartridge 1 is not in use, a leader tape (mechanism by which a recording and reproducing apparatus using the magnetic tape cartridge 1 introduces the magnetic tape 20 to a given tape travel passage provided within the recording and reproducing apparatus) 21 is secured to the leading end portion of a hook 18 which is incorporated into the portion of the magnetic tape cartridge 1 that is located near to the side surface thereof.

In the respective given side walls of the upper and lower cases 2a and 2b which cooperate together in forming the cartridge case 2, there are formed cutaway portions 24a and 24b that cooperate together in forming a magnetic tape pull-out opening 24 of the cartridge case 2 through which the magnetic tape 20 can be pulled out. And, in the magnetic tape pull-out opening 24, there is mounted a lid 30 which can be opened and closed in the direction of the plane of the magnetic tape cartridge 1; in more particular, the lid 30 is journaled on a lid support shaft 14 in a freely openable and closable manner and can be energized in its closing direction by a lid spring 15 formed of a torsion coil spring; and, further, the, lid 30 is secured by a lid lock 40 properly energized by a lid spring 16 in order to be able to prevent the lid 30 from rotating when the magnetic tape cartridge 1 is not in use. Also, at the position on the opposite side of the cartridge case 2 that is opposed to the lid 30, there is incorporated a light protect piece 17.

And, if the above-mentioned magnetic tape cartridge 1 is set in its corresponding recording and reproducing apparatus such as an external storage or the like, then rotation drive mechanism provided on the apparatus side is engaged with the securing teeth of the reel 3 exposed to an opening 2c formed in the central portion of the lower case 2b against the energizing force of the reel spring 8 and, at the same time, the lid 30 is opened by a tape null-out mechanism provided on the apparatus side and the leader tape 21 is thus pulled in to a given position in the tape travel passage, thereby enabling data to be written into and read from the magnetic tape 20.

By the way, when assembling the above-mentioned magnetic tape cartridge 1 comprising a large number of parts, in order to be able to assemble as many parts as possible in a unit time as well as reduce the cost thereof and avoid as much defective assembling as possible, it is necessary to use an automatic assembling apparatus.

As such automatic assembling apparatus, there is available an assembling line in which a plurality of assembling stations each including an assembling robot for receiving works sequentially fed by delivery mechanism such as a belt conveyor or the like and also for assembling various parts to the works are arranged in a straight line manner. That is, the present assembling line is a multipurpose automatic assembling apparatus in which, by changing properly jigs to be mounted on the manipulator leading end portions of the assembling robots in the respective assembling stations, parts different in shapes can be assembled sequentially.

When assembling the magnetic tape cartridge 1 using the above-mentioned automatic assembling apparatus, for example, at first, the upper case 2a to be handled as the work is set on a pallet placed on a belt conveyor while it is reversed or turned upside down; various Darts such the reel spring 8, brake springs 12 and 13, front and rear reel brakes 50 and 51, lid spring 15, lid 30, hook 18, light protect piece 17 and the like are previously assembled to the thus reversed upper case 2a at the respective assembling stations; next, the reel 3 is assembled onto the upper case 2a; and, after then, the lower case 2b is assembled onto the upper case 2a.

However, the magnetic tape cartridge 1 comprises a large number of component parts which are previously assembled while they are elastically energized by the spring members such as the reel spring 8, brake springs 12 and 13, lid spring 15 and the like; and, therefore, when feeding the upper case 2a sequentially, the respective component parts are easy to drop off or fall down. That is, in the magnetic tape cartridge 1, there arises a problem that it is difficult to deliver the work using the delivery mechanism such as a belt conveyor and the like.

Also, in the magnetic tape cartridge 1, when assembling the reel 3 into the upper case 2a, the front and rear reel brakes 50 and 51 must be held in such a manner that the respective locking gear portions of the front and rear reel brakes 50 and 51 can be evacuated from the installation area of the reel 3, or the reel 3 must be held on the upper case 2a side against the energizing force of the reel spring 8 until the lower case 2b is assembled onto the upper case 2a. Due to this, when assembling the above-mentioned component parts in the assembling line in which the plurality of assembling stations are arranged in the above-mentioned straight line manner, there must be provided in the respective assembling stations hold mechanism which are capable of holding the front and rear reel brakes 50, 51 and reel 3 in the above-mentioned manner, which results in the complicated structures of the assembling stations.

Further, since a severe assembling accuracy is required of the magnetic tape cartridge 1, the behavior of the work to be delivered on the belt conveyor must be controlled accurately. This mechanism that the above-mentioned conventional automatic assembling apparatus is not able to provide such magnetic tape cartridge as can meet the severe assembling accuracy but the yield of the magnetic tape cartridge in the assembling process is lowered.

DISCLOSURE OF THE INVENTION

The present invention aims at eliminating the above-mentioned drawbacks found in the conventional automatic assembling apparatus. Accordingly, it is an object of the invention to provide improved method and apparatus for assembling a magnetic tape cartridge, In which a magnetic tape cartridge with an excellent assembling accuracy can be obtained with high productivity.

The above-mentioned object can be attained by, according to one aspect of the invention, a method for assembling a magnetic tape cartridge, the magnetic tape cartridge comprising: a reel including rotation-driving engaging mechanism for driving or rotating magnetic tape and, a restricting gear for restricting the rotation of the reel, the rotation-driving engaging mechanism being formed on the outer surface of the bottom portion of a reel hub on which the magnetic tape can be wound, the restricting gear being disposed on the outer peripheral edge of a flange portion projected in the diameter direction of the reel from the outer periphery of the upper end of the reel hub; a cartridge case for storing the reel therein in such a manner that the reel can be rotated, the cartridge case comprising a lower case and an upper case to be superimposed on the upper portion of the lower case, the lower case including in the bottom portion thereof a rotation-driving opening capable of exposing the rotation-driving engaging mechanism; a reel spring interposed between the upper case and reel for energizing the reel toward the lower case side; a reel brake rotatably journaled on the upper case, including a locking gear portion meshingly engageable with the restricting gear of the reel, and energized in the meshingly engaging direction thereof by a brake spring; and, a lid mounted openably and closably in a magnetic tape pull-out opening formed in the cartridge case for pulling out the magnetic tape, the lid being energized in the closing direction thereof by a lid spring, wherein a plurality of assembling stations, which are respectively arranged in a straight line manner and each of which includes an assembling robot for assembling the respective parts of the magnetic tape cartridge, are respectively capable of delivering sequentially a pallet with the upper case placed thereon, and also wherein reel brake hold mechanism capable of holding the locking gear portion of the reel brake against the energizing force of brake spring in such a manner that the reel brake retreats from the installation area of the reel, lid spring hold mechanism capable of holding the lid engaging portion of the lid spring in such a manner that the lid engaging portion is not in engagement with the lid, and reel hold mechanism capable of holding the reel on the upper case side against the energizing force of the reel spring are driven sequentially by their associated drive mechanism disposed in their associated ones of the assembling stations, whereby the respective parts of the magnetic tape cartridge are assembled onto the upper case by their associated ones of the assembling robots.

Also, in achieving the above object, according to another aspect of the invention, there is provided apparatus for assembling a magnetic tape cartridge, the magnetic tape cartridge comprising: a reel including rotation-driving engaging mechanism for driving or rotating magnetic tape and, a restricting gear for restricting the rotation of the reel, the rotation-driving engaging mechanism being formed on the outer surface of the bottom portion of a reel hub on which the magnetic tape can be wound, the restricting gear being disposed on the outer peripheral edge of a flange portion projected in the diameter direction of the reel from the outer periphery of the upper end of said reel hub; a cartridge case for storing the reel therein in such a manner that the reel can be rotated, the cartridge case comprising a lower case and an upper case to be superimposed on the upper portion of the lower case, the lower case including in the bottom portion thereof a rotation-driving opening capable of exposing the rotation-driving engaging mechanism; a reel spring interposed between the upper case and reel for energizing the reel toward the lower case side; a reel brake rotatable journaled on the upper case, including a locking gear portion meshingly engageable with the restricting gear of the reel, and energized in the meshingly engaging direction thereof by brake spring; and, a lid mounted openably and closably in a magnetic tape pull-out opening formed in the cartridge case for pulling out the magnetic tape, the lid being energized in the closing direction thereof by a lid spring, wherein a plurality of assembling stations, which are respectively arranged in a straight line manner and each of which includes an assembling robot for assembling the respective parts of the magnetic tape cartridge, respectively comprises pallet delivery mechanism capable of delivering sequentially a pallet with the upper case placed thereon, also wherein the pallet comprises reel brake hold mechanism capable of holding the reel brake against the energizing force of the brake spring in such a manner that the reel brake retreats from the installation area of the reel, lid spring hold mechanism capable of holding the lid engaging portion of the lid spring in such a manner that the lid engaging portion is not in engagement with the lid, reel hold mechanism capable of holding the reel on the upper case side against the energizing force of the reel spring, and further wherein the respective hold mechanism are driven sequentially by their associated ones of drive mechanism respectively disposed in their associated ones of the assembling stations.

According to the above-mentioned structure, the reel is assembled to the upper case, which is placed on the pallet to be delivered sequentially to the given assembling positions of the respective assembling stations, while the locking gear portions of the front and rear reel brakes are held by their associated ones of the hold mechanism respectively disposed in the pallet in such a manner that they retreat from the reel installation area; and, at the same time, the lid is also assembled to the upper case, while the lid engaging portion of the lid spring is held by its associated one of the above-mentioned hold mechanism in such a manner that it is not in engagement with the lid. This makes it possible to facilitate the assembling operations of the reel and lid. Since the reel is delivered to the next assembling station while it is held on the upper case side against the energizing force of the reel spring, there is no fear that the reel can be removed from its given position when the pallet is delivered.

Also, the above-mentioned respective hold mechanism are disposed in each of the pallets and, therefore, in the respective assembling stations, there may be disposed only the drive mechanism which are simple in structure and are capable of driving their associated hold mechanism. Thanks to this, the structures of the respective assembling stations can be simplified.

By the way, preferably, each of the hold mechanism may include an arm member journaled in a freely swingable manner, and elastically energizing mechanism capable of clicking the arm member between a hold position and a non-hold position; and, on the swing end side of the arm member to be swung in a direction towards a given position by the energizing force of the drive mechanism which is contacted with the arm member, there may be formed a hold portion for holding the above-mentioned respective parts. In this preferred structure, the drive mechanism is able to click the arm member between the hold position and non-hold position simply by driving a pressure member to advance and retreat, while the pressure member is simple in structure and can be advanced and retreated with respect to the contact portion of the arm member.

BEST MODE FOR CARRYING OUT THE PRESENT INVENTION

Figure 13:
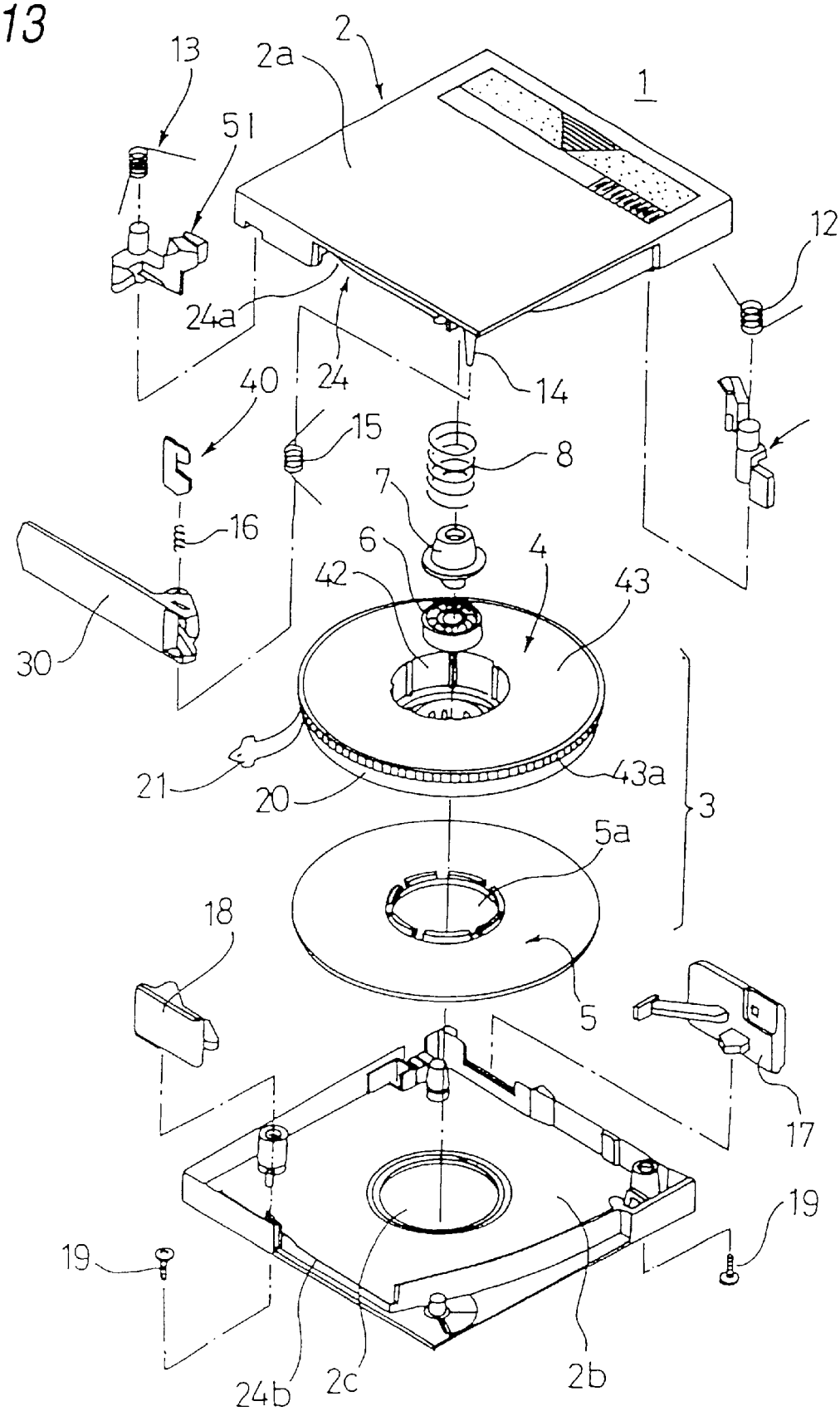

Now, description will be given below in detail of method and apparatus for assembling a magnetic tape cartridge according to an embodiment of the invention with reference to the accompanying drawings. By the way, since a magnetic tape cartridge according to the present embodiment employs a similar structure to the above-mentioned conventional magnetic tape cartridge 1, in the present embodiment, the same designations as those shown in FIG. 13 are given to the parts thereof and thus the detailed description thereof is omitted here.

Figure 1:
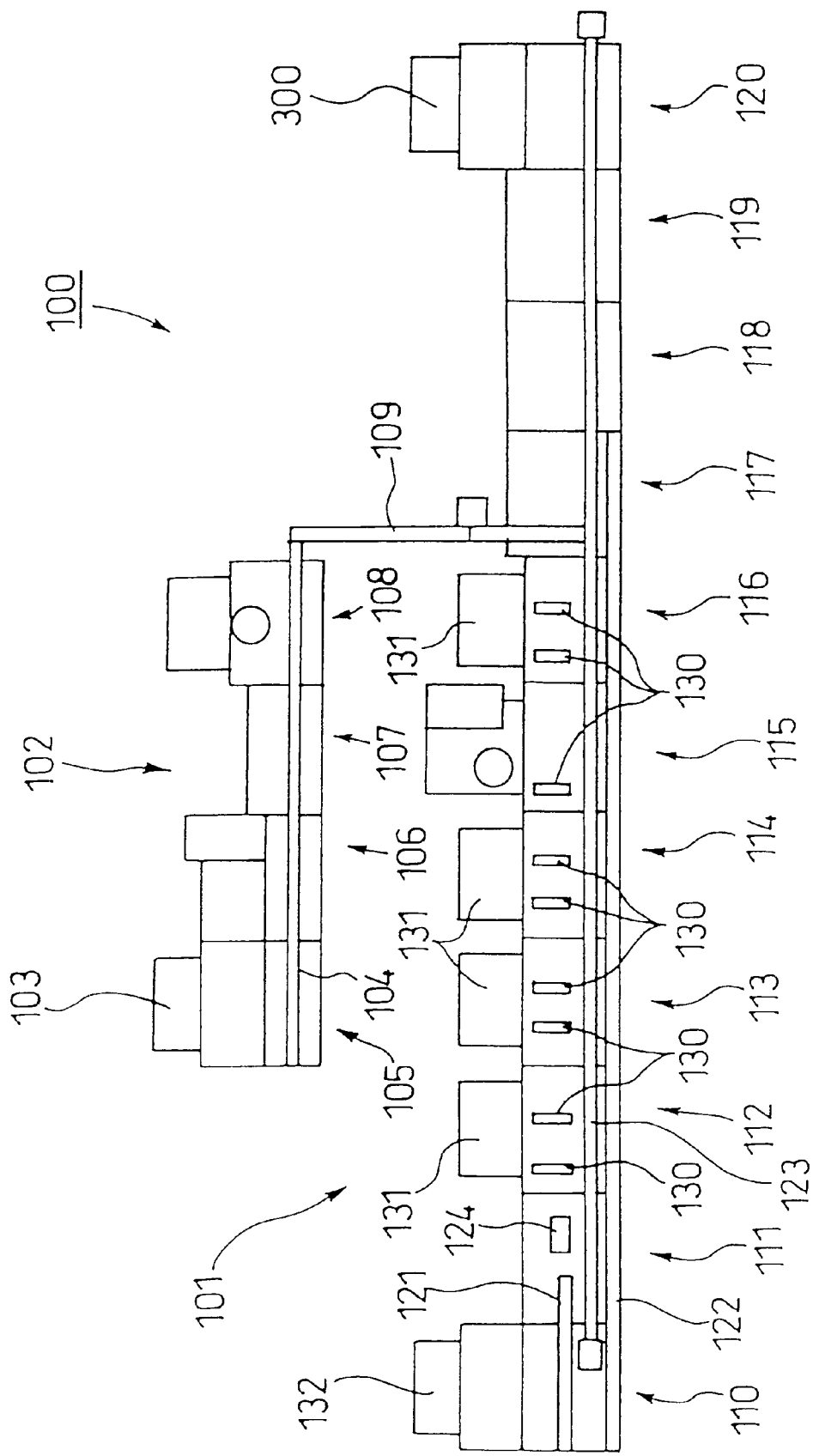
FIG. 1 is a schematic structure view of a magnetic tape cartridge assembling apparatus according to an embodiment of the invention.

Now, a magnetic tape cartridge assembling apparatus 100 according to the invention, as shown in FIG. 1, consists mainly of a cassette assembling line 101 and a reel assembling line 102.

The reel assembling line 102 comprises an upper reel supply station 105 for supplying an upper reel 4 from a part container 103 to a belt conveyor 104, a lower reel supply/weld station 106 for superimposing a lower reel 5 on top of the upper reel 4 and welding them together by ultrasonic waves, a welding check station 107 for checking the welded condition of the upper and lower reels 4 and 5, and a bearing/plug mounting station 108 for pressure inserting and fixing a bearing 6 and a spring plug 7 to a reel 3; and, the reel assembling line 102 supplies the reel 3 through a belt conveyor 109 to a reel assembling station 117 included in a cassette assembling line 101 which will be discussed later.

The cassette assembling line 101 comprises a cartridge supply station 110, a hot print station 111, a front reel brake assembling station 112, a rear reel brake assembling station 113, a hook and lid spring assembling station 114, a lid assembling station 115, a light protect piece and reel spring assembling station 116, a reel assembling station 117, a lower case assembling station 118, a cartridge check station 119, and a cartridge collect station 120.

The upper and lower cases 2a and 2b, which cooperate together in forming the magnetic tape cartridge 1, include a large number of thin pins and other complicated structures and, therefore, the upper and lower cases 2a and 2b can be deformed easily. That is, from the viewpoint of not only such easily deformable property thereof but also the space efficiency and handling efficiency thereof, the upper and lower cases 2a and 2b are previously stored within a container 132 in a pair.

Thus, in the cartridge supply station 110, the upper and lower cases 2a and 2b stored in a pair within the part container 132 are taken out of the part container 132 and separated from each other and, after then, the thus separated upper and lower cases 2a and 2b are respectively transferred onto individual belt conveyors 121 and 122. The upper case 2a, which is transferred onto the belt conveyor 121, is delivered to the hot print station 111 located downstream, whereas the lower case 2b transferred onto the belt conveyor 122 is delivered through the respective stations down to the lower case assembling station 118.

In the hot print station 111, the upper case 2a on the belt conveyor 121 is placed onto a pallet 200 which is also placed on a pitch conveyor 123 and, after then, an identification mark for light protection is formed on the upper case 2a by a hot stamp device 124.

By the way, when placing the upper case 2a onto the pallet 200 on the pitch conveyor 123, if the gap of the upper case 2a with respect to the positioning engaging portion of the pallet 200 is reduced in order to enhance the positioning accuracy thereof, then there is a possibility that the upper case 2a cannot be engaged with the positioning engaging portion of the pallet 200 even when it is quite slightly shifted in positions On the other hand, if the gad of the upper case 2a with respect to the positioning engaging portion of the pallet 200 is set large, then the upper case 2a becomes rickety and thus, when the upper case 2a is positioned, the position shift of the upper case 2a becomes large in correspondence to the large gap. If the position shift of the upper case 2a with respect to the pallet 200 is large, then it is impossible to position the upper case 2a accurately with respect to the assembling stations located downstream.

Figure 2:
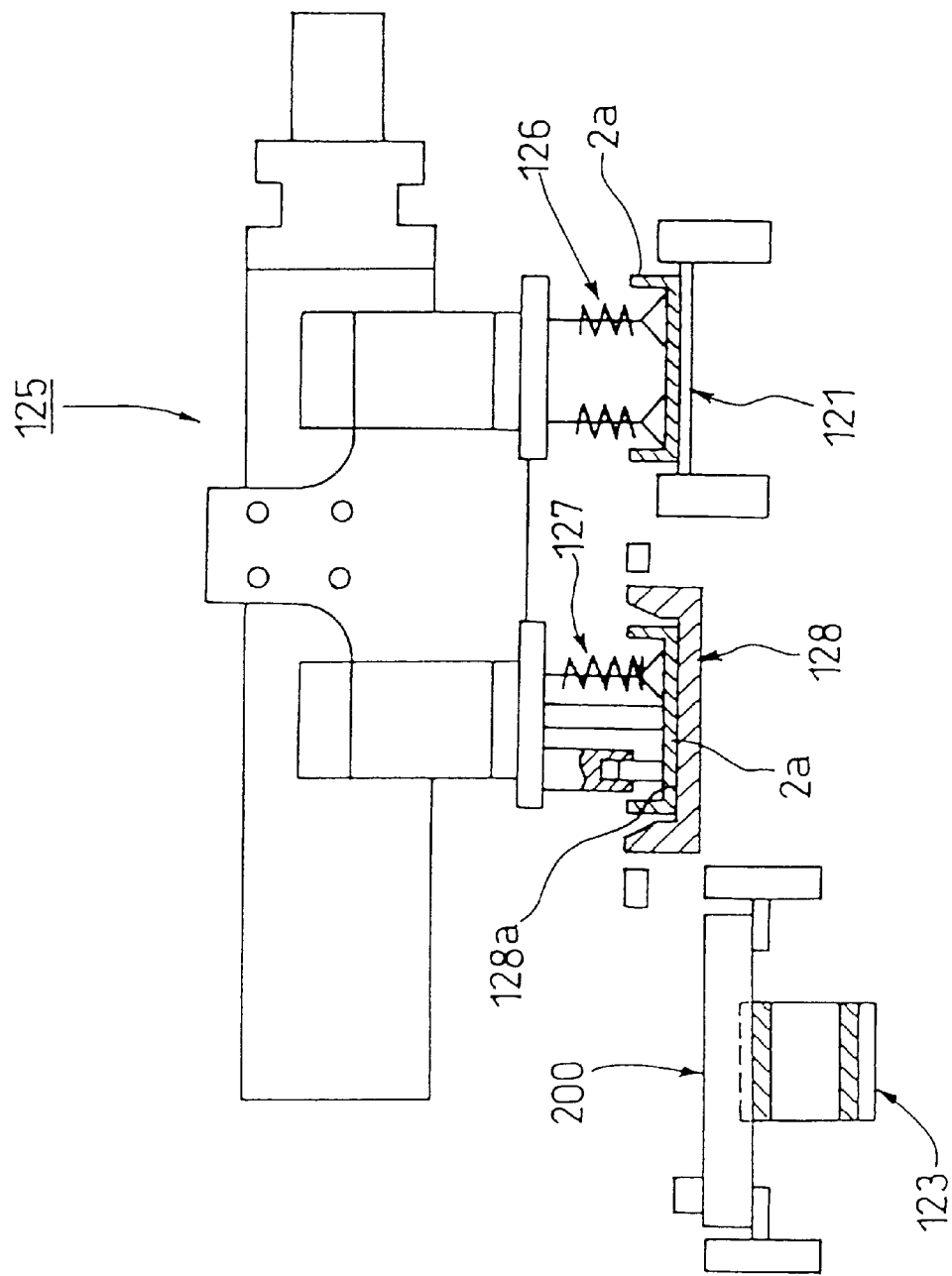
FIG. 2 is a schematic section view of a transfer device for transferring an upper case onto a pallet disposed on a pitch conveyor.
Figure 3:
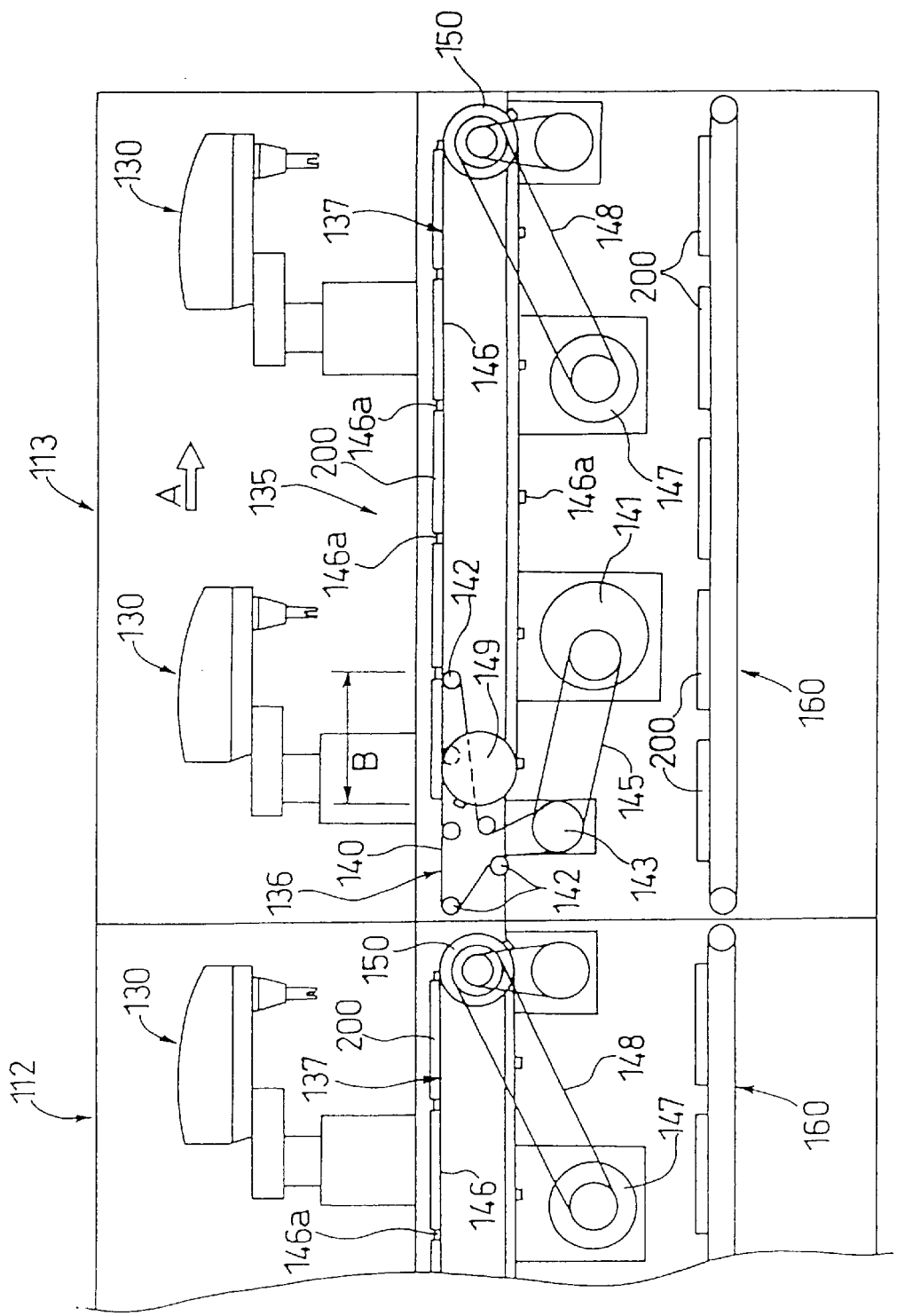
FIG. 3 is a schematic front view of a rear reel brake assembling station shown in FIG. 1.
Figure 4:
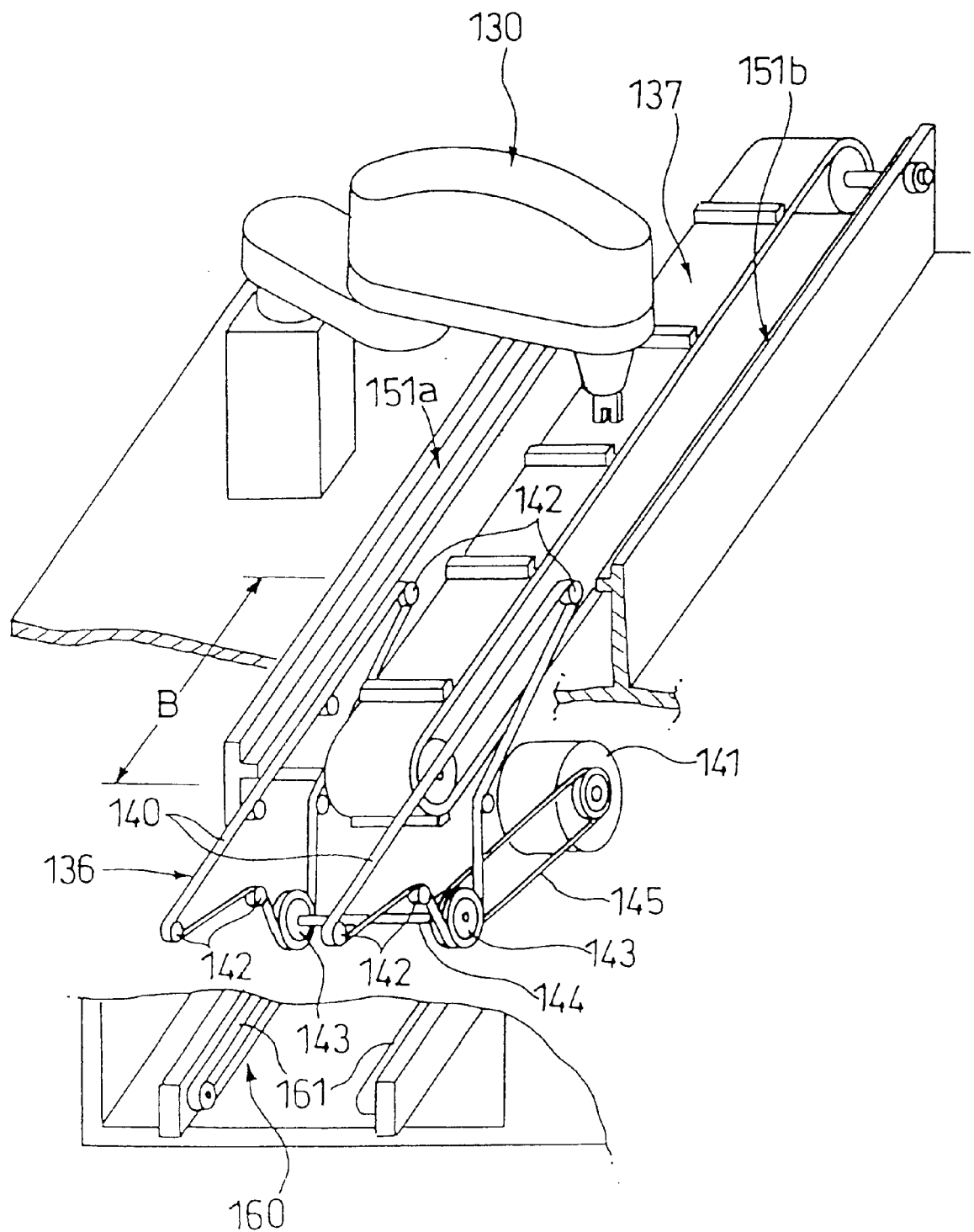
FIG. 4 is a partially broken perspective view of the main portions of delivery mechanism employed in the rear reel brake assembling station shown in FIG. 3.

For this reason, between the belt conveyor 121 and pitch conveyor 123, as shown in FIG. 2, there is interposed a temporary stand 128 including a positioning recessed portion 128a into which the upper case 2a can be loosely fitted. When compared with the gap of the positioning engaging portion of the pallet 200 with respect to the upper case 2a, the gap of the positioning recessed portion 128a of the temporary stand 128 with respect to the upper case 2a is set large and, therefore, when the upper case 2a is transferred onto the temporary stand 128 from the belt conveyor 121 by an adsorbing mechanism 126 disposed in a transfer device 125 in such a manner that it is loosely fitted into the positioning recessed portion 128a of the temporary stand 128, but the upper case 2a is placed there while it is not shifted in position greatly.

Next, the upper case 2a is transferred from the temporary stand 128 to the pallet 200 by another adsorbing mechanism 127. In particular, as described above, since the upper case 2a is roughly positioned by the temporary stand 128, even if the gap of the upper case 2a with respect to the positioning engaging portion of the pallet 200 is set small to thereby enhance the positioning accuracy thereof, the upper case 2a can be transferred and placed onto the positioning engaging portion of the pallet 200 with accuracy because the placement of the upper case 2a onto the pallet 220 is executed based on the placement position in the temporary stand 128.

In this manner, since the upper case 2a is placed onto the positioning engaging portion of the pallet 200 through the position correction operation by the temporary stand 128, the transfer device 125 itself need not have a high-accuracy positioning function end thus it can be structured by a multipurpose device.

And, to the upper case 2a placed on the pallet 200 on The delivery mechanism. 123, there are assembled various component parts such as the front and reel brakes 50 and 51, lid 30, reel 3, lower case 2b and the like respectively in the front reel brake assembling station 112, rear reel brake assembling station 113, hook and lid spring assembling station 114, lid assembling station 115, light protect piece and reel spring assembling station 116, reel assembling station 117, and lower case assembling station 118.

Here, in the respective assembling stations, not only one to three parts are assembled but also the parts are checked for the number thereof. That is, as the number of parts to be assembled in one station increases, it becomes more difficult for the station to adapt itself to the change of the product, but the cost thereof becomes lower. Therefore, the number of parts to be assembled in the respective assembling stations is decided according to the possibilities of the change of the product.

The respective assembling stations arranged in a linear line comprise an assembling robot 130 for assembling the various component parts of the magnetic tape cartridge 1, a part feeder 131 for supplying the parts to the assembling robot 130, pallet delivery mechanism 135 capable of delivering sequentially the pallet 200 with the upper case 2a placed thereon, a belt conveyor 122 for delivering the lower case 2b, and a return conveyor 160 for delivering the empty pallet 200 to the upstream side; that is, each assembling station forms an independent assembling station unit. By the way, the pallet delivery mechanism 135, belt conveyors 122 and return conveyors 160 in the respective assembling stations are substantially the same in the base structure, although they are in fact slightly different in the details thereof.

Figure 6:
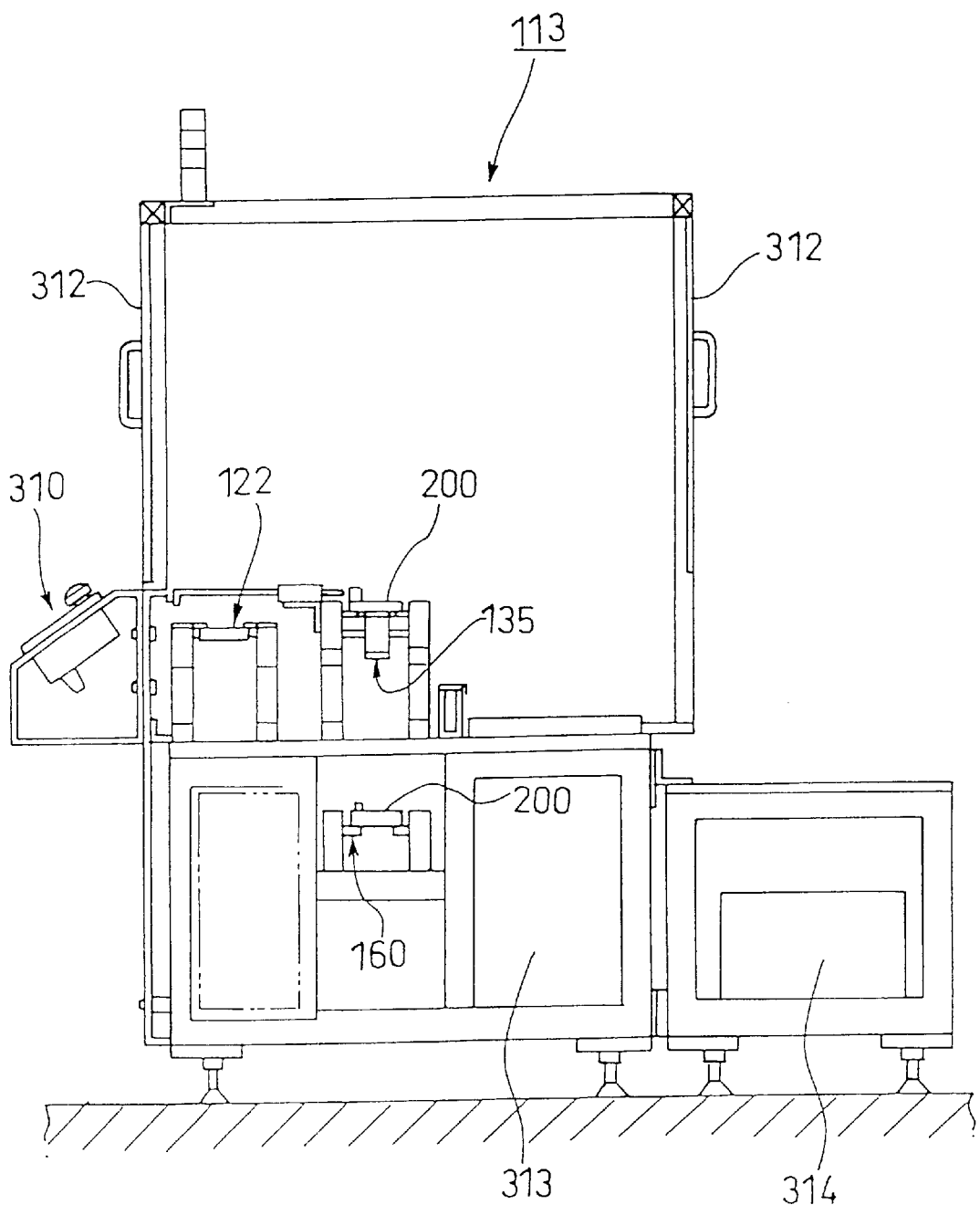
FIG. 6 is a schematic section view of the rear reel brake assembling station shown in FIG. 1.

Also, for example, as in the rear reel brake assembling station 113 shown in FIG. 6, the two side surfaces of each of the assembling stations in the width direction thereof are covered by open/close doors 312 for maintenance and, on this side of each assembling station, there is disposed a control panel 310. And, in each assembling station, there are disposed various control devices such as a delivery mechanism control unit 313, an assembling robot control unit 314 and the like.

The pallet delivery mechanist 137 in each assembling station, for example, as in the rear reel brake assembling station 113 shown in FIGS. 3 to 6, comprises a transfer conveyor 136 and a pitch conveyor 137; that is, the pallet delivery mechanism 135 is capable of delivering the pallet 200 to the downstream assembling stations while transferring the pallet 200 sequentially.

The transfer conveyor 136 can be controlled in such a manner that the speed thereof can be changed in two stages by driving a pair of endless belts 140 using a speed variable motor 141 such as an inverter motor or the like. Each endless belt 140 is wound over a plurality of belt pulleys 142, 143, and can be moved clockwise in FIG. 3 with the rotation of a belt pulley 143 which is fixed to a rotary shaft 144 and can be driven by the speed variable motor 141 through a drive belt 145.

And, when transferring the pallet 200 placed on each endless belt 141 from the upstream side (in FIG. 3, the left side) pitch conveyor 137 to the downstream side (in FIG. 3, the right side) pitch conveyor 137 along a given delivery direction (in the direction of an arrow line A shown in FIG.

3), the transfer belt 136, in a lapping area B between the pitch conveyor 137 and itself, is able to increase the moving speed of the endless belt 140 from a first speed to a second speed in accordance with the variations in the speed of the pitch conveyor 137.

The pitch conveyor 137 drives intermittently an endless belt 146 including a plurality of pawl members 146a on the outer surface thereof by a drive motor 147 such as a servo motor or the like. The endless belt 146 is wound over a pair of pulleys 149 and 150 and, as the drive pulley 150 is rotated by the drive motor 147, the endless belt 140 is moved clockwise in FIG. 3 while rotating the driven pulley 149. The drive pulley 150 is connected to the drive motor 147 through a drive belt 148.

Referring to the operation of the endless belt 140 of the transfer conveyor 136, if the pallet 200 placed thereon is contacted with the front-side pawl member 146a of the pitch conveyor 137 and the pitch conveyor 137 is started to be driven, then the speed of the endless belt 140 is increased from the first speed to the second speed prior to the time when the rear-side pawl member 146a of the pitch conveyor 137 is contacted with the pallet 200. That is, when the rear-side pawl member 146a of the pitch conveyor 137 is contacted with the pallet 200, the second speed of the endless belt 140 of the transfer conveyor 136 becomes faster than the speed of the endless belt 146 of the pitch conveyor 137.

In other words, with the delivery-direction front end of the pallet 200 in contact with the front-side pawl member 146a of the pitch conveyor 137, the rear-side pawl member 146a of the pitch conveyor 137 rises while moving around the driven pulley 149; and, therefore, the delivery-direction rear end of the pallet 200 receives few shocks from the rear-side pawl member 146a of the pitch conveyor 137. Therefore, the respective component parts assembled to the upper case 2a placed on the pallet 200 can be positively prevented from shifting in position, dropping down or the like due to the shocks given by the rear-side pawl member 146a of the pitch conveyor 137, which makes it possible to transfer the pallet 200 between the assembling stations in a stable manner.

And, the pallet 200 placed on the pitch conveyor 137 in each assembling station is guided and supported by two guide portions 151a and 151b respectively formed on the two sides of the endless belt 146, is pushed and driven intermittently by the rear-side pawl member 146a of the pitch conveyor 137, and is delivered to the part assembling position of each assembling robot 130; and, after then, the pallet 200 is positioned at an accurate part assembling position by pallet positioning mechanism (which will be discussed later), and desired parts are assembled to the upper case 2a placed on the pallet 200 by the assembling robot 130.

Figure 5:
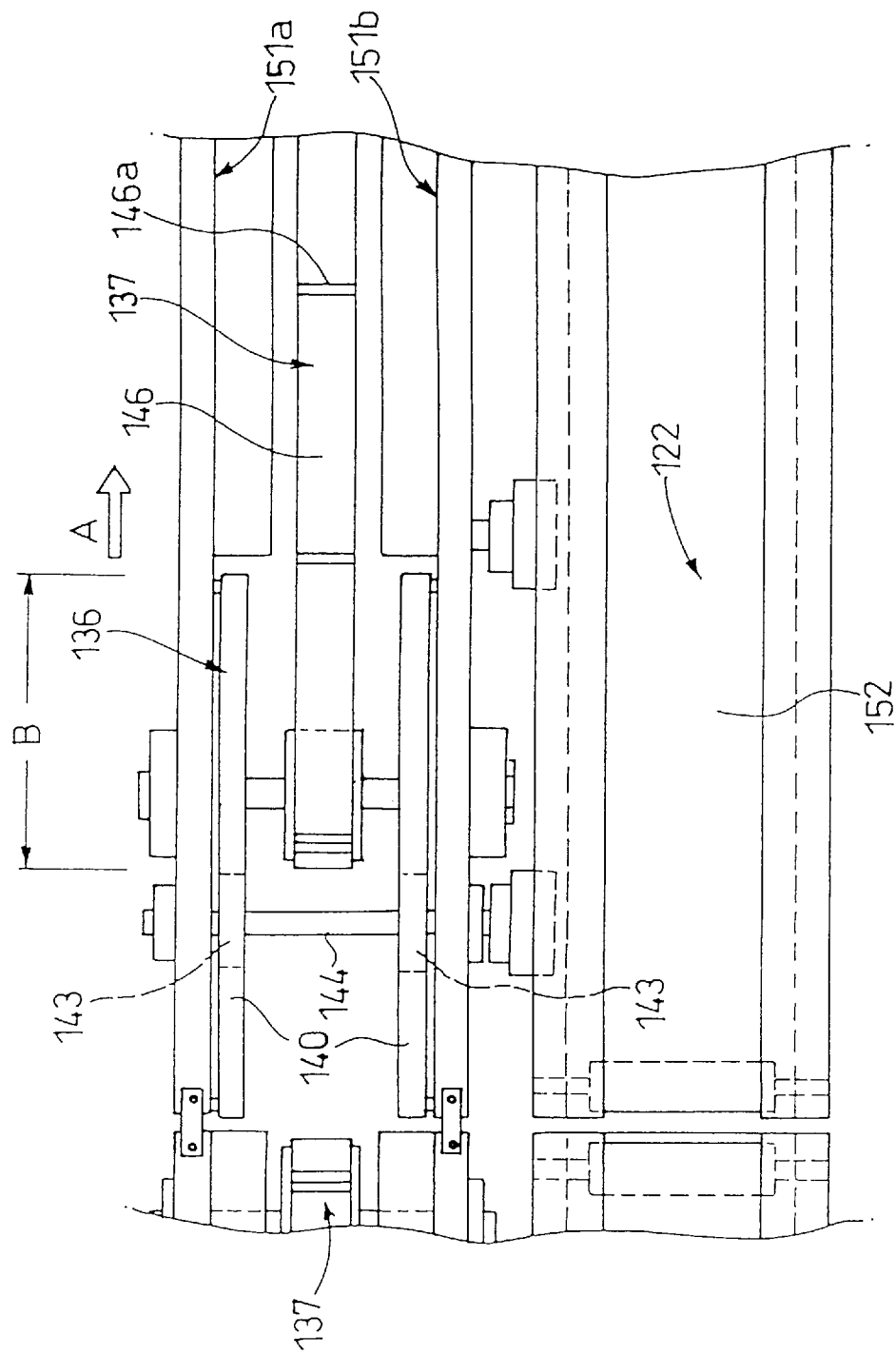
FIG. 5 is a plan view of the main portions of the delivery mechanism shown in FIG. 3.

The belt conveyor 22, as shown in, FIGS. 5 and 6, is arranged laterally of the pallet delivery mechanism 135 along the delivery direction thereof, and delivers the lower case 2b, which is placed on a wide endless belt 152 to be driven by a drive motor (not shown), down to the lower case assembling station 118 in such a manner that the lower case 2b moves side by side with the upper case 2a.

Also, the return conveyor 160 is arranged downwardly of the pallet delivery mechanism 135 along the delivery direction thereof; and, if a pair of endless belts 161 are driven by a drive motor (not shown), then the return conveyor 160 delivers or returns the empty pallet 200, from which the completely assembled magnetic tape cartridge 1 has been removed in the cartridge collect station 120, to the hot print station 111 located on the upstream side.

By the way, the pallet 200 is transferred from the pitch conveyor 137 onto the return conveyor 160 or from the return conveyor 160 onto the pitch conveyor 123 by lift devices (not shown) which are respectively disposed in the cartridge collect station 120 and hot print station 111.

Therefore, the pallet 200 circulate between the cartridge collect station 120 and hot print station 111 in the cassette assembling line 101.

Also, the pallet delivery mechanism according to the invention is not limited to the above-mentioned structure but, of course, it can employ any one of the various well-known structures.

Next, description will be given below of the structure of the pallet 200 which is sequentially delivered by the pallet delivery mechanism 135.

Figure 7:
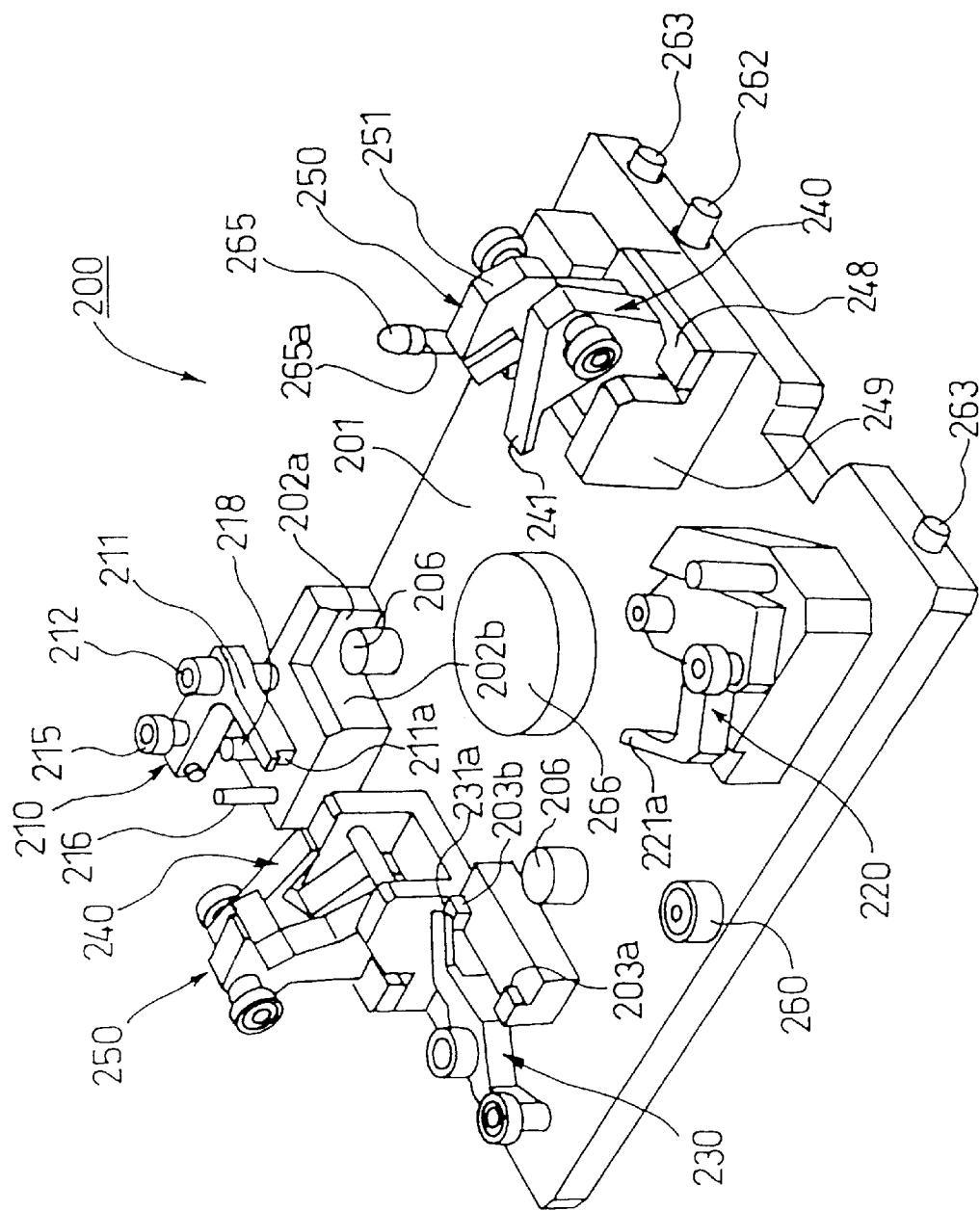
FIG. 7 is a perspective view of the whole of a pallet to be delivered sequentially by pallet delivery mechanism shown in FIG. 1.
Figure 8:
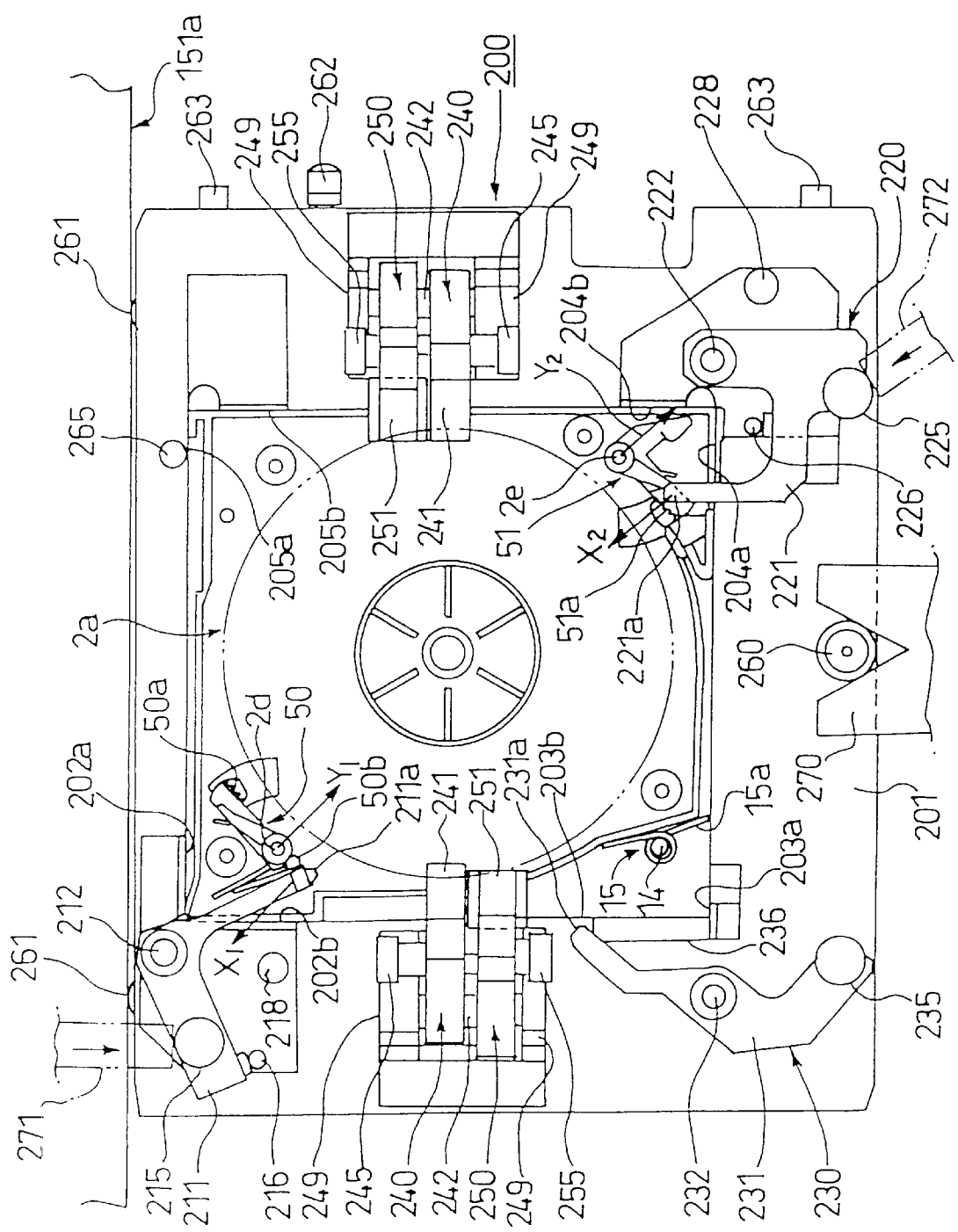
FIG. 8 is a plan view of the pallet shown in FIG. 7, explaining the functions of the pallet.

The pallet 200, as shown in FIGS. 7 and 8, comprises four positioning engaging portions which are respectively formed at the four corner portions of a substantially rectangular-shaped base plate 201 and are used to position the upper case 2a, front reel brake hold mechanism 210 which is capable of holding the locking gear portion 50a of the front reel brake 50 in such a manner that the locking gear portion 50a can recede from the installation area (in FIG. 8, an area shown by an imaginary line) of the reel 3 against the energizing force of the braking spring 12 consisting of a torsional coil spring, rear reel brake hold mechanism 220 which is capable of holding the locking gear portion 51a of the rear reel brake 51 in such a manner that the locking gear portion 51a can recede from the installation area of the reel 3 against the energizing force of the braking spring 13 consisting of a torsional coil spring, lid spring hold mechanism 230 capable of holding the lid engaging portion 15a of the lid spring 15 in such a manner that the lid engaging portion 15a is not in engagement with the lid 30, reel hold mechanism 240 capable of holding the reel 3 on the upper case 2a side against the energizing force of the reel spring 8, lower case hold mechanism 250 capable of holding the lower case 2b, before it is connected by the screws 19, on the upper case 2a side against the reel spring 8, and a securing pin 265 capable of holding the light protect piece 17 temporarily by the jaw portion 265a thereof.

The four positioning engaging portions for positioning the upper case 2a comprise support walls 202a, 203a, 204a, 205a and support walls 202b, 203b, 204b, 205b respectively formed at the four corner portions of the base plate 210 for positioning the upper case 2a within a horizontal surface which extends not only along the delivery direction of the upper case 2a but also along the width direction of the upper case 2a, and four cylindrical-shaped support members 206 respectively having upper end faces which are capable of positioning the upper case 2a in the vertical direction thereof.

Thus, referring in particular to the positioning of the upper case 2a placed on the pallet 200, the upper face of the upper case 2a is supported on the respective upper end faces of the four cylindrical-shaped support members 206 so that the vertical direction of the upper case 2a can be thereby positioned and, at the same time, the outer peripheral edges of the four corners of the upper case 2a are enclosed by the support walls 202a, 203a, 204a, 205a and support walls 202b, 203b, 204b, 205b so that the position of the upper case 2a can be decided within the above-mentioned horizontal surface.

The front reel brake hold mechanism 210 includes an arm member 211 swingably journaled on a support shaft 212 disposed perpendicularly on the base plate 201, and elastically energizing mechanism (the details of which are not shown) which is used to energize the arm member 211 to thereby execute its clicking operation between a front reel brake hold position (a position shown in FIG. 8) and a front reel brake non-hold position (a position shown in FIG. 7). The elastically energizing mechanism is structured such that the two ends thereof are disposed with the support shaft 212 between them; for example, one end thereof is put on a support pin provided perpendicularly on the arm member 211, whereas the other end is put on a support pin provided at a given position; and, if the support shaft 212 and the pair of support pins, for example, are arranged on the same straight line and the arm member 211 is swung in any direction away from a position where the energizing rotation force of the elastically energizing mechanism is held at a neutral state, then the elastically energizing mechanism energizes the arm member 211 in the swing direction thereof to thereby allow the arm member 211 to execute its clicking operation. By the way, the swing range of the arm member 211 is restricted as it is contacted with a stopper pin 216 or 218.

In the pallet inner swing end of the arm member 211, there is formed a hold portion 211a which is used to hold the upper edge of the removing arm portion 50b of the front reel brake 50 against the energizing force of the brake spring 12. In particular, the hold portion 211a is structured such that not only it can prevent the front reel brake 50 from rotating due to the energizing force of the brake spring 12 but also the stepped portion or tapered surface of the hold portion 211a can prevent the front reel brace 50 from floating up.

The rear reel brake hold mechanism 220 is situated on a diagonal line facing the front reel brake hold mechanism 210 and has a substantially similar structure to the front reel brake hold mechanism 210. In particular, the rear reel brake hold mechanism 220 comprises an arm member 221 which is swingably journaled on a support shaft 222 disposed perpendicularly on the base plate 201, and elastically energizing mechanism (the details of which are not shown) which is used to energize the arm member 221 to thereby execute its clicking operation between a rear reel brake hold position (a position shown in FIG. 8) and a rear reel brake non-hold position (a position shown in FIG. 7). The elastically energizing mechanism is structured such that the two ends thereof are disposed with the support shaft 222 between them; for example, one end thereof is put on a support pin provided perpendicularly on the arm member 221, whereas the other end is put on a support pin provided at a given position; and, if the support shaft 222 and the pair of support pins, for example, are arranged on the same straight line and the arm member 221 is swung in any direction away from a position where the energizing rotation force of the elastically energizing mechanism is held at a neutral state, then the elastically energizing mechanism energizes the arm member 221 in the swing direction thereof to thereby allow the arm member 221 to execute its clicking operation. By the way, the swing range of the arm member 221 is restricted as it is contacted with a stopper pin 226 or 228.

In the pallet inner swing end of the arm member 221, there is formed a hold portion 221a which is used to hold the upper edge of the engaging arm portion of the rear reel brake 51, in which the above-mentioned locking gear portion 51a is formed, against the energizing force of the brake spring 13. In particular, the hold portion 221a is structured such that not only it can prevent the rear reel brake 51 from rotating due to the energizing force of the brake spring 13 but also the stepped portion or tapered surface of the hold portion 221a can prevent the rear reel brake 51 from floating up.

Further, the respective reel brake hold forces (in FIG. 8, which are shown by arrow lines $X^1$, $X^2$ respectively) of the arm members 211 and 221 with respect to the front and rear reel brakes 50 and 51 work as forces (in FIG. 8, which are shown by arrow lines $Y^1$, $Y^2$ respectively) which move the upper case 2a substantially in the same direction, so that the reel brake hold forces always keep the upper case 2a in contact with the support walls 204a and 204b. That is, while keeping the upper case 2a in this state, the front and rear reel brake hold mechanism 210 and 220 are able to not only position the upper case 2a accurately with respect to the pallet 200 but also apply a preload thereto. This not only can facilitate the insertion of parts in the following steps but also can prevent the parts against removal due to the vibrations caused while the pallet 200 is being delivered.

The lid spring hold mechanism 230 comprises an arm member 231 which is swingably journaled on a support shaft 232 disposed perpendicularly on the base plate 201, and elastically energizing mechanism (the details of which are not shown) which is used to energize the arm member 231 to thereby execute its clicking operation between a lid spring hold position (a position shown in FIG. 9) and a lid spring non-hold position (a position shown in FIGS. 7 and 8). The elastically energizing mechanism is structured such that the two ends thereof are disposed with the support shaft 232 between them; for example, one end thereof is put on a support pin provided perpendicularly on the arm member 231, whereas the other end is put on a support pin provided at a given position; and, if the support shaft 232 and the pair of support pins, for example, are arranged on the same straight line and the arm member 231 is swung in any direction away from a position where the energizing rotational force of the elastically energizing mechanism is held at a neutral state, then the elastically energizing mechanism energizes the arm member 231 in the swing direction thereof to thereby allow the arm member 231 to execute its clicking operation. By the way, the swing range of the arm member 231 is restricted as it is contacted with a stopper portion 236 or the above-mentioned support pins which serve also as stopper pins to stop the swinging motion of the am member 231.

In the pallet inner swing end of the arm member 231, there is formed a hold portion 231a consisting of a groove having a V-shaped section which is capable of holding the lid engaging portion 15a of the lid spring 15 against the energizing force of the lid spring 15. Further, since there is formed a tapered surface in the swing end side lower end edge of the arm member 231 that faces the peripheral edge of the upper case 2a, there can be set a small clearance between the lower surface of the arm member 231 held at the lid spring hold position and the inner surface of the upper case 2a, thereby being able to prevent the upper case 2a from floating up.

Now, the reel hold mechanism 240 is interposed between a pair of support walls 249 and 249 which are perpendicularly provided on the base plate 201 in such a manner that they are paired but are opposed to each other along the pallet delivery direction. In particular, the reel hold mechanism 240 comprises: an arm member 241 swingably journaled on a horizontal support shaft 242, while the horizontal support shaft 242 is disposed astride the pair of support walls 249 and 249 in such a manner that it extends in the width direction of the base plate 201 extending along the pallet delivery direction; and, elastically energizing mechanism (the details of which are not shown) which is used to energize the arm member 241 to thereby execute its clicking operation between a reel hold position (in FIG. 10, at the right position) and are reel non-hold position (see FIG. 11). That is, the elastically energizing mechanism is structured such that the two ends thereof are disposed with the horizontal support shaft 242 between them; for example, one end thereof is put on a support pin provided perpendicularly on the side surface of the arm member 241, whereas the other end is put on a support pin provided at an arbitrary position; and, if the horizontal support shaft 242 and the pair of support pins, for example, are arranged on the same straight line and the arm member 241 is swung in any direction away from a position where the energizing rotational force of the elastically energizing mechanism is held at a neutral state, then the elastically energizing mechanism energizes the arm member 241 in the swing direction thereof to thereby allow the arm member 241 to execute its clicking operation. By the way, the swing range of the arm member 241 is restricted as it is contacted with a stopper shaft 246 or a stopper portion 248.

In the pallet inner swing end of the arm member 241, there is formed a hold portion 241a which is capable of holding the flange portion 43 of the reel 3 on the upper case 2a side against the energizing force of the reel spring 8. By the way, the hold portion 241a may be preferably set such that it can be contacted with the portion of the flange portion 43 located outwardly of the tape winding area thereof.

The lower case hold mechanism 250 is interposed between the pair of support walls 249 and 249 and is located beside the reel hold mechanism 240. In particular, the lower case hold mechanism 250 comprises an arm member 251 swingably journaled on the horizontal support shaft 242, and elastically energizing mechanism (the details of which are not shown) which is used to energize the arm member 251 to thereby execute its clicking operation between a lower case hold position (in FIG. 10, at the left position) and a lower case non-hold position (see FIG. 11). That is, the elastically energizing mechanism is structured such that the two ends thereof are disposed with the horizontal support shaft 242 between them; for example, one end thereof is put on 2 support pins provided perpendicularly on the side surface of the arm member 251, whereas the other end is put on a support pin provided at an arbitrary position; and, if the horizontal support shaft 242 and the pair of support pins, for example, are arranged on the same straight line and the arm member 251 is swung in any direction away from a position where the energizing rotational force of the elastically energizing mechanism is held at a neutral state, then the elastically energizing mechanism energizes the arm member 251 in the swing direction thereof to thereby allow the arm member 241 to execute its clicking operation. By the way, the swing range of the arm member 251, similarly to the arm member 241 of the reel hold mechanism 240, is restricted as it is contacted with the stopper shaft 246 or stopper portion 248.

In the pallet inner swing end of the arm member 251, there is formed a hold portion 251a which is capable of holding the case bottom surface of the lower case 2b on the upper case 2a side against the energizing force of the reel spring 8. By the way, in order to prevent the lower case 2b against damage, the hold portion 241a may be preferably formed of resin material, Also, in order to be able to form pallet positioning mechanism which is used to position the pallet 200 at the given assembling positions of the respective assembling stations, in the pallet 200, as shown in FIGS. 7 and 8, there are disposed a positioning roller 260 provided on and projected from the upper surface of the side portion of the base plate 201 located on the opposite side to the guide portion 151a in such a manner that the positioning roller 260 can be freely rotated, and a pair of guide rollers 261 and 261 rotatably mounted on the side surface of the base plate 201 in such a manner that they can be slidingly contacted with the side wall surface of the guide portion 151a.

That is, at the given assembling position of each of the assembling stations, there is disposed a pressure member 270 in such a manner that it is opposed to the guide portion 151a and can be so driven by an air cylinder or the like as to advance and retreat with respect to the guide portion 151a. In particular, if the pressure member 270 is driven to advance toward the guide portion 151a and the V-shaped groove formed in the leading end of the pressure member 270 is thereby engaged with the positioning roller 260, then the pallet 200 is energized in a direction where the pair of guide rollers 261 and 261 can be slidingly contacted with the side wall surface of the guide portion 151a to be thereby positioned not only in the width direction thereof but also in the delivery direction thereof, so that the pallet 200 can be positioned accurately at the given assembling position of each assembling station. On the other hand, if the pressure member 270 is driven to retreat away from the guide portion 151a side and the leading end V-shaped groove thereof is disengaged from the positioning roller 260, then the pallet 200 can be held again in a state where it can be delivered by the pallet delivery mechanism 135.

Also, within a cylindrical-shaped case 266 disposed in the central portion of the pallet 200, there is provided a magnet (see FIG. 10) for attracting the reel spring 8 in such a manner that the reel spring 8 can be held substantially on the same shaft as a boss projectingly provided on the inner wall surface of the upper case 2a.

Further, for example, in order to be able to absorb shocks produced by a collision between the mutually adjoining pallets 200 when the pallets 200 are transferred by the return conveyor 160, in the front end portion of each pallet 200 in the delivery direction thereof, there are disposed buffer mechanism 262 formed of an oil cylinder or a spring, and two or more elastic projections 263.

Next, description will be given below of the operation of the pallet 200 in the cassette assembling line 101.

At first, before the upper case 2a is placed onto the pallet 200, in the pallet 200, as shown in FIG. 7, the front reel brake hold mechanism 210, rear reel brace hold mechanism 220, lid spring hold mechanism 230, reel hold mechanism 240 and lower case hold mechanism 250 are all energized by their respective springs to their respective non-hold positions.

And, after the upper case 2a is placed onto the pallet 200 in the hot print station 111, the pallet 200 is delivered by the pallet delivery mechanism 135 to the front reel brake assembling station 112.

In the front reel brake assembling station 112, at first, the brake spring 12 is mounted on the brake support shaft 2d of the upper case 2a by the upstream-side assembling robot 130. After then, the downstream-side assembling robot 130 fits the front reel brake 50 with the brake support shaft 2d to thereby secure the leg portion of the brake spring 12 to the back surface of the locking gear portion 50a of the front reel brake 50. Next, while holding the front reel brake 50, the assembling robot 130 rotates the front reel brake 50 up to a position where the locking gear portion 50a recedes from the installation area of the reel 3 against the energizing force of the braking spring 12.

In response to this, a pressure member 271, which is structured such that it can be advanced and retreated with respect to the contact portion 215 of the arm member 211 when it is driven by its associated drive mechanism (not shown) such as an air cylinder or the like, presses and energizes the contact portion 215 of the arm member 211 to thereby swing the arm member 211 in the hold position direction against the energizing rotation force of the above-mentioned elastically energizing mechanism (see FIG. 8). And, in this state, the assembling robot 130 removes the holding state of the front reel brake 50 and thus, if the front reel brake 50 returns to its initial position, then the upper edge of the removing arm portion 50b of the front reel brake 50 is then held by the hold portion 211a of the arm member 211.

Next, the pallet 200 is delivered to the rear reel brake assembling station 113 by the pallet delivery mechanism 135.

In the rear reel brake assembling station 113, at first, the brake spring 13 is mounted on the brake support shaft 2e of the upper case 2a by the upstream-side assembling robot 130. After then, the downstream-side assembling robot 130 fits the rear reel brake 51 with the brake support shaft 2e to thereby secure the leg portion of the brake spring 13 to the back surface of the locking gear portion 51a of the front reel brake 51. Next, while holding the rear reel brake 51, the assembling robot 130 rotates the rear reel brake 51 up to a position where the locking gear portion 51a recedes from the installation area of the reel 3 against the energizing force of the brake spring 13.

In response to this, a pressure member 272, which is structured such that it can be advanced and retreated with respect to the contact portion 225 of the arm member 221 when it is driven by its associated drive mechanism (not shown) such as an air cylinder or the like, presses and energizes the contact portion 225 of the arm member 221 to thereby swing the arm member 221 in the hold position direction against the energizing rotation force of the above-mentioned elastically energizing mechanism (see FIG. 8). And, in this state, the assembling robot 130 removes the holding state of the rear reel brake 51 and thus, if the rear reel brake 51 returns to its initial position, then the upper edge of the engaging arm portion of the rear reel brake 51, in which the locking gear portion 51a is formed, is held by the hold portion 221a of the arm member 221.

Here, preferably, the above-mentioned front and rear reel brake hold mechanism 210 and 220 may be set such that, when their respective arm members 211 and 221 are respectively holding the front and rear reel brakes 50 and 5i, support forces acting substantially in the lower right direction of the pallet 200 in FIG. 8 can be applied to the respective hold portions 211a and 221a of the two arm members 211 and 221. If the are set in this manner, then the upper case 2a is energized substantially in the lower right direction of the pallet 200 in FIG. 8 by reactive forces applied to the upper case 2a through the front and rear reel brakes 50, 51 and brake support shafts 2d, 2e, so that the lower right corner portion of the upper case 2a can be pressed against the support walls 204a and 204b.

That is, the support walls 202a, 203a, 204a, 205a as well as support walls 202b, 203b, 204b, 205b, which respectively enclose the respective outer peripheral edges of the four corner portions of the upper case 2a in order to decide the position of the upper case 2a within a horizontal plane with respect to the pallet 200, always have respective clearances with respect to their associated outer peripheral edges of the four corner portions of the upper case 2a in consideration of variations in the forming accuracy of the upper case 2a.

However, since the lower right corner portion of the upper case 2a is pressed against the support walls 204a and 204b in the above-mentioned manner, the position of the upper case 2a within the above-mentioned horizontal plane with respect to the pallet 200 can be always decided accurately.

By the way, the pressure member 271 (272) and arm member 211 (221) are structured in the following manner: that is, if the contact portion 215 (225) is pressed and energized by the pressure member 271 (272) slightly toward the hold position side from a certain position where the energizing rotation force of the above-mentioned elastically energizing mechanism is held at its neutral state, then the arm member 211 (221) can be swung in the hold position direction due to the energizing rotation force of the elastically energizing mechanism itself (themselves).

Therefore, the drive mechanism for driving the pressure member 271 (272) to advance and retreat does not require a large advance and retreat stroke and thus, as such drive mechanism, it is possible to employ drive mechanism which is low in cost and simple in structure, such as an air cylinder or the like Next, the pallet 200 is delivered to the hook and lid spring assembling station 114 by the pallet delivery mechanism 135.

In the hook and lid spring assembling station 114, at first, the hook 18 is assembled by the upstream-side assembling robot 130 and, after then, the downstream-side assembling robot 130 mounts the lid spring 15 onto the lid support shaft 14 of the upper case 2a (see FIG. 8). And, the lid engaging portion 15a of the lid spring is pressed and rotated up to a lid securable position by a pressure pin (not shown).

Figure 9:
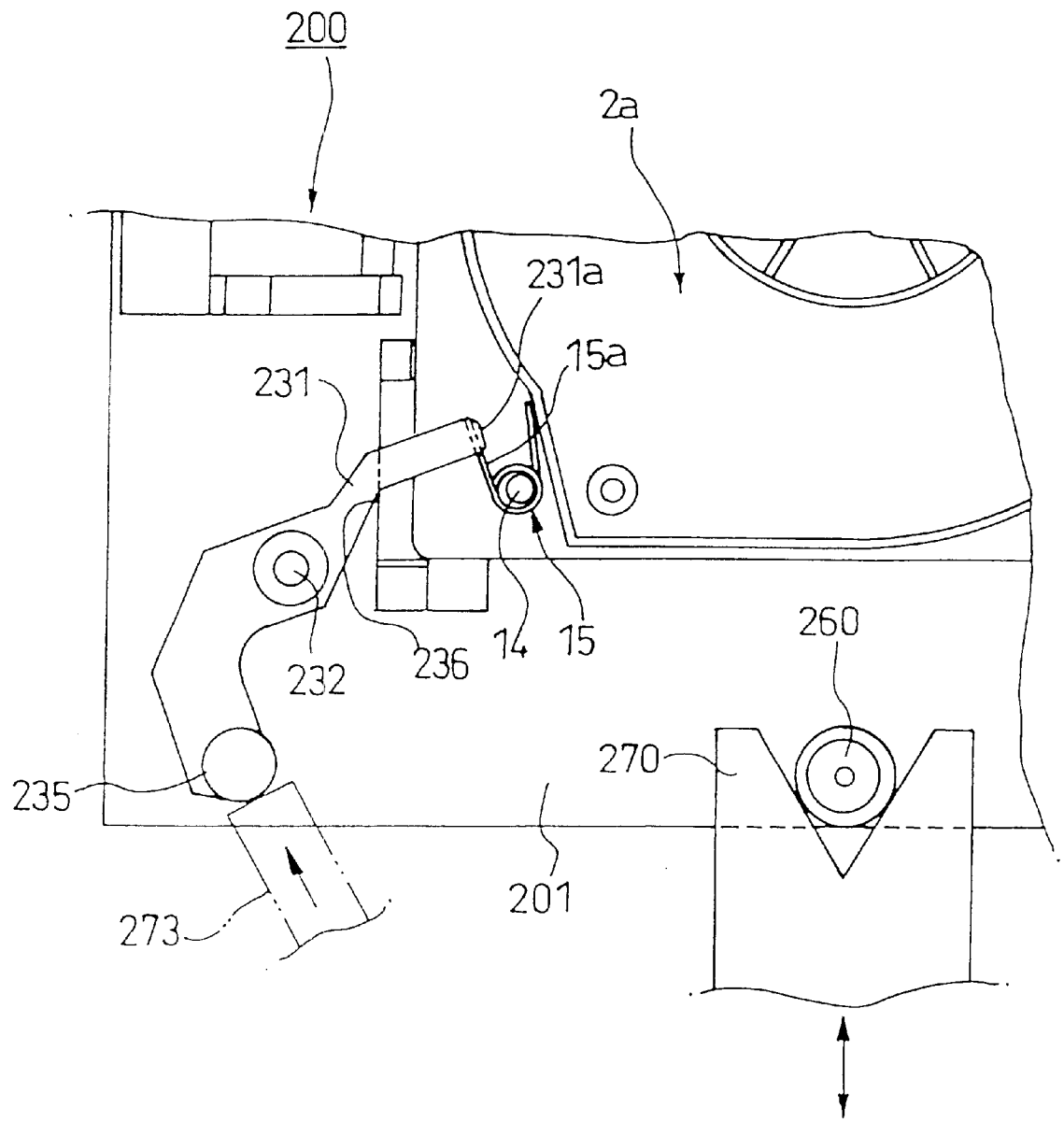
FIG. 9 is an enlarged plan view of the main portions of lid spring hold mechanism disposed on the pallet shown in FIG. 8.

In response to this, a pressure member 273, which is structured such that it can be advanced and retreated with respect to the contact portion 235 of the arm member 231 when it is driven by its associated drive mechanism (not shown) such as an air cylinder or the like, presses and energizes the contact portion 235 to thereby swing the arm member 231 in the hold position direction against the energizing rotation force of the above-mentioned elastically energizing mechanism (see FIG. 9). And, in this state, the pressure pin of the assembling robot 130 removes the engaged state of the lid engaging portion 15a and thus, if the lid spring 15 returns to its original position, then, as shown in FIG. 9, the lid engaging portion 15a of the lid spring 15 is held by the hold portion 231a of the arm member 231.

And, the pallet 200 is delivered to the lid assembling station 115 by the pallet delivery mechanism 135.

In the lid assembling station 115, the lid 30, to which a lid lock is previously assembled, is mounted on the lid support shaft 14 of the upper case 2a, and the lid engaging portion 15a of the lid spring 15 is secured to the engaging recessed portion of the lid 30.

In this case, since the lid engaging portion 15a of the lid spring 15 is held by the arm member 231 in such a manner that it is no in engagement with the lid 30, the lid 30 can be easily mounted from above the lid support shaft 14. After then, if the contact portion 235 of the arm member 231 is pressed and energized by its associated pressure member (not shown) to thereby swing the arm member 231 in the non-hold position direction against the energizing rotation force of the above-mentioned elastically energizing mechanism, then the mutual engagement between the hold portion 231a of the arm member 231 and the lid engaging portion 15a of the lid spring 15 is removed, so that the lid engaging portion 15a of the lid spring 15 is secured to the engaging recessed portion of the lid 30. This facilitates the assembling of the lid 30 onto the lid support shaft 14.

Next, the pallet 200 is delivered to the light protect piece and reel spring assembling station 116, where the light protect piece 17 is assembled to the upper case 2a and also the reel spring 8 is mounted on a boss which is provided on and projected from the inner wall surface of the upper case 2a.

And, in the reel assembling station 117, the reel 3 is assembled onto the upper case 2a placed on the pallet 200 by a reel supply device (not shown) By the way, at the then time, the reel spring 8 is checked for the mounted condition thereof and, if there is found any magnetic tape cartridge in which the reel spring 8 is not assembled normally, then the present magnetic tape cartridge is discharged out of the cassette assembling line 101.

Figure 10:
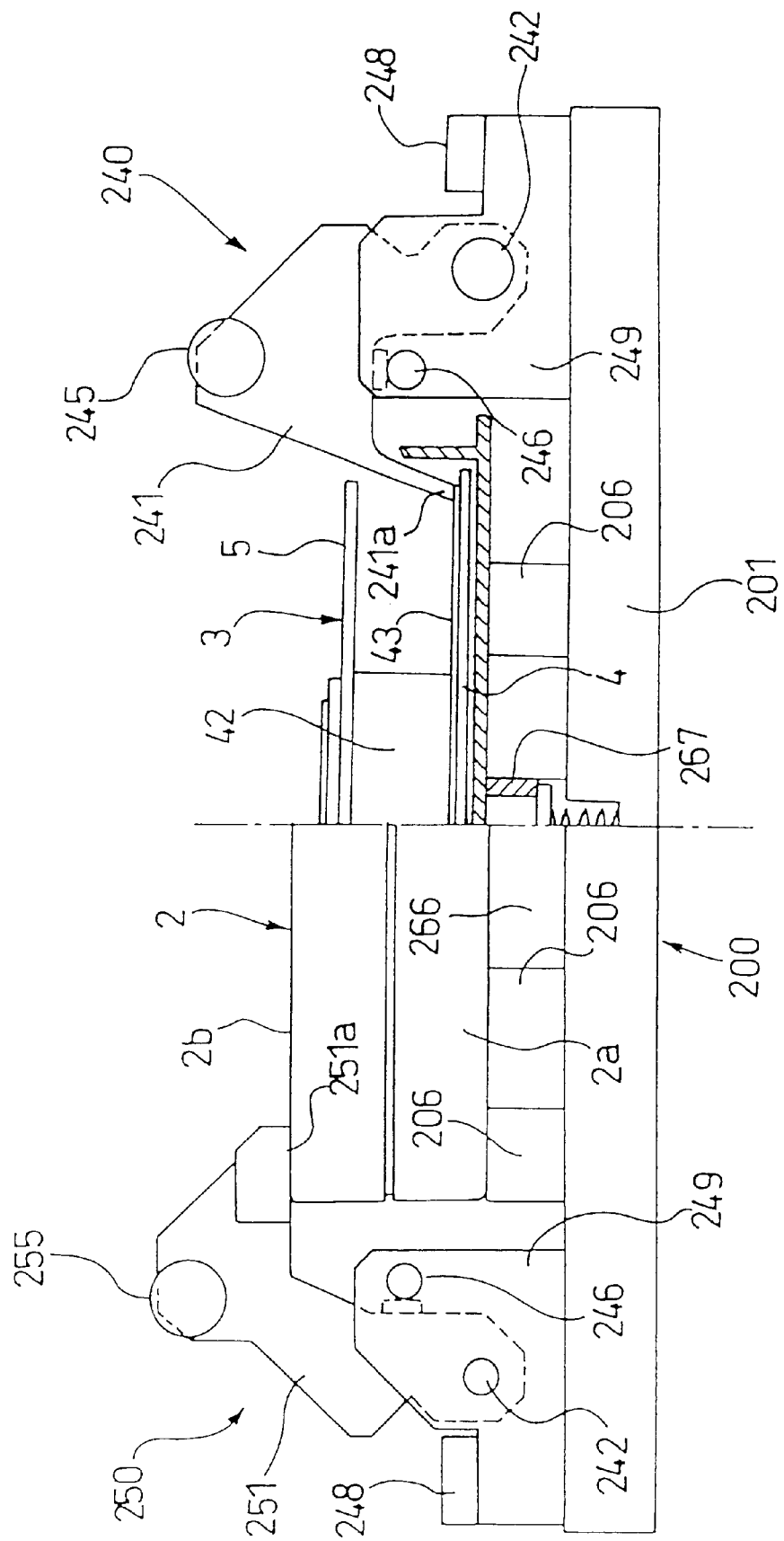
FIG. 10 shows, on the right side thereof, a partially sectional explanatory view of reel hold mechanism disposed on the pallet shown in FIG. 7, and shows, on the left side thereof, an explanatory, partially sectional view of lower case hold mechanism also disposed on the pallet shown in FIG. 7.

After then, if the contact portion 245 of the reel hold mechanism 240 is pressed and energized by its associated pressure member (not shown) to thereby swing the arm member 241 in the reel hold position direction against the energizing rotation force of the above-mentioned elastically energizing mechanism, then, as shown on the right side of FIG. 10, the hold portion 241a holds the flange portion 43 of the reel 3 on the upper case 2a side against the energizing force of the reel spring 8. Accordingly, even after the reel supply device returns to its initial position, the reel 3 is able to maintain its assembled state to the upper case 2a against the energizing force of the reel spring 8.

Next, the pallet 200 is delivered to the lower case assembling station 118. In the lower case assembling station 118, the lower case 2b is firstly assembled to the upper case 2a which is placed on the pallet 200.

Figure 11:
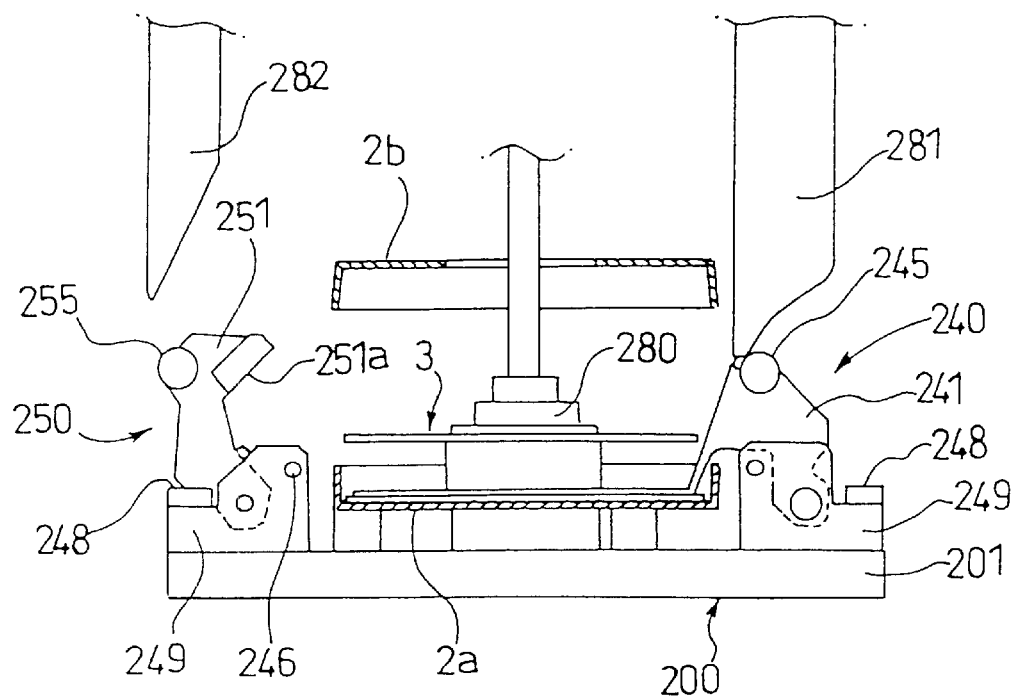
FIG. 11 is a front view of the main portions of an upper case supply device, explaining the operations of the reel hold mechanism and lower case hold mechanism of the pallet respectively shown in FIG. 10.

After then, as shown in FIG. 11, in a state where the reel hub 42 of the reel 3 is supported on the upper case 2a side by a reel press-down member 280 against the energizing force of the reel spring 8, the upper case supply device holding the lower case 2b is moved down on the pallet 200 side by chuck mechanism (not shown) Also, the above-mentioned upper case supply device includes a pressure member 281 serving as drive mechanism which can be moved down on the pallet 200 side to thereby press and energize the contact portion 245 of the reel hold mechanism 240 and thus swing the arm member 241 in the non-hold position direction against the energizing rotation force of the above-mentioned elastically energizing mechanism, and another pressure member 282 serving as another drive mechanism which can press and energize the contact portion 225 of the lower case hold mechanism 250 to thereby swing the arm member 251 in the lower case hold direction against the energizing rotation force of the above-mentioned elastically energizing mechanism.

Figure 12:
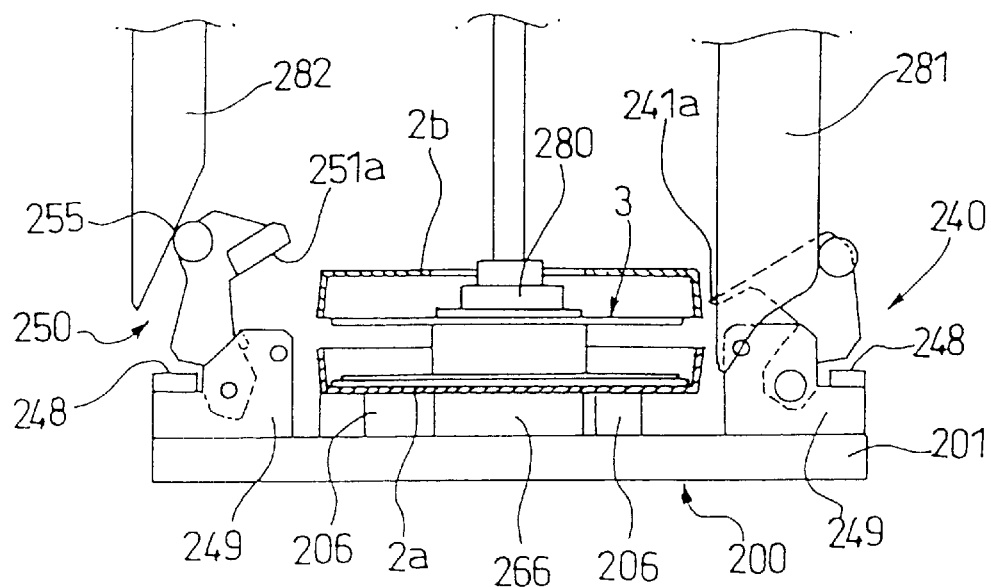
FIG. 12 is also a front view of the main portions of the upper case supply device, explaining the operations of the reel hold mechanism and lower case hold mechanism of the pallet respectively shown in FIG. 10; and, FIG. 13 is an exploded perspective view of a magnetic tape cartridge according to the invention.

Now, if the upper case supply device is moved down by a given distance or more, then, as shown in FIG. 12, the hold portion 241a of the arm member 241 is swung in the non-hold position direction so that it does not interfere with the lower case 2b. And, the upper case supply device is moved down further and, at the same time when the lower case 2b is almost superimposed on top of the upper case 2a, the hold portion 251a of the arm member 251, as shown on the left side of FIG. 10, holds the case bottom surface of the lower case 2b on the upper case 2a side against the energizing force of the reel spring 8. Therefore, even when the reel press-down member 280 rises and returns back to its initial position, the lower case 2b is able to maintain its superimposed state with respect to the upper case 2b against the energizing force of the reel spring 8.

And, the cartridge case 2 with the mutually superimposed upper and lower cases 2a and 2b, as it is, is delivered to a screw tightening device which is disposed downstream, where the screws are tightened.

The thus assembled magnetic tape cartridge 1 is then delivered to the cartridge check station 119, where the screw tightened state of the cartridge case 2 is checked, the swinging motions of the front and rear reel brakes 50 and 51 are checked, the spring force of the reel spring 8 is checked, the swinging motion of the light protect piece 17 is checked, the swinging motion of the lid lock is checked, and the opening and closing motion of the lid 30 is checked; and, if found defective, the magnetic tape cartridge 1 is discharged from the cassette assembling line 101.

Finally, the magnetic tape cartridges 1, which are confirmed as the completely assembled products, are stored sequentially into a storage container 300 from their respective pallets 200 in the cartridge collect station 120.

That is, in the method and apparatus for assembling a magnetic tape cartridge according to the present embodiment of the invention, to the upper case 2a which is placed on the pallet 200 to be delivered sequentially to the given assembling positions of the respective assembling stations, there can be assembled the reel 3; in more particular, the reel 3 can be assembled to the upper case;2a such that not only the locking gear portions 50a and 51a of the front and rear reel brakes 50 and 51 are respectively so held by the front and rear reel brake hold mechanism 210 and 220 respectively formed in the pallet 200 as to retreat from the installation area of the reel 3, but also the upper case 2a is positioned by the front and rear reel brake hold mechanism 210 and 220. Also, the lid engaging portion 15a of the lid spring 15 can be held by the lid spring hold mechanism 230 in such a manner that the lid engaging portion 15a is not in engagement with the lid 30; that is, the lid 30 can be assembled in this manner. This make it possible to facilitate the respective assembling operations of the reel 3 and lid 30.

Further, since the reel 3 is delivered to the next assembling station while it is held on the upper case 2a side against the energizing force of the reel spring 8 by the reel hold mechanism 240, there is no fear that the reel 3 can be removed from its given position when the pallet 200 is delivered.

Still further, because the lower case 2b is delivered to the next assembling station while it is held on the upper case 2a side against the energizing force of the reel spring 8 by the lower case hold mechanism 250, there is no fear that the lower case 2b can be removed from its given position when the pallet 200 is delivered.

In addition, since the above-mentioned respective hold mechanism 210, 220, 230, 240, and 250 are disposed in the respective pallets 200 and, in the respective assembling stations, as drive mechanism respectively for driving these hold mechanism 210, 220, 230, 240, and 250, only the drive mechanism, which are respectively low in cost and simple in structure, such as an air cylinder or the like, may be disposed, the structures of the respective assembling stations can be simplified. By the way, into the respective contact portions 215, 225, 235, 245 and 255 of the hold mechanism 210, 220, 230, 240, and 250 with which their associated drive mechanism can be contacted, there are incorporated rotatable bearings in order to be able to reduce the drive resistance thereof.

Also, the pallet according to the invention is not limited to the structure of the pallet 200 constructed according to the above-illustrated embodiment. That is, it goes without saying that the structures of the respective hold mechanism and the structures of the pallet positioning mechanism can be changed properly. By the way, preferably, the elastically energizing mechanism, which are shown in FIGS. 7 and 8 and are used to click the respective arm members, may be formed of coil springs or the like.

INDUSTRIAL APPLICABILITY

In the method and apparatus for assembling a magnetic tape cartridge according to the present invention, the reel is assembled to the upper case, which is placed on the pallet to be delivered sequentially to the given assembling positions of the respective assembling stations, while the locking gear portions of the front and rear reel brakes are held by their associated ones of the hold mechanism respectively disposed in the pallet in such a manner that they retreat from the reel installation area; and, at the same time, the lid is also assembled to the upper case, while the lid engaging portion of the lid spring is held by its associated one of the above-mentioned hold mechanism in such a manner that it is not in engagement with the lid. This makes it possible to facilitate the assembling operations of the reel and lid. Since the reel is delivered to the next assembling station while it is held on the upper case side against the energizing force of the reel spring, there is no fear that the reel can be removed from its given position when the pallet is delivered.

Also, the above-mentioned respective hold mechanism are disposed in the respective pallets and, therefore, in the respective assembling stations, there may be disposed only the drive mechanism which are simple in structure and are capable of driving these hold mechanism. Thanks to this, the structures of the respective assembling stations can be simplified.

Accordingly, the present invention can provide improved method and apparatus for assembling a magnetic tape cartridge, in which a magnetic tape cartridge having an excellent assembling accuracy can be obtained with high Productivity.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A method for assembling a magnetic tape cartridge, the magnetic tape cartridge comprising:
    a reel (3) including a reel hub (42) around which a magnetic tape is wound and a flange portion (43) projected in a radial direction of said reel from an outer periphery of an upper portion of said reel hub, wherein said reel hub (42) is provided at its bottom portion with a driving engaging portion which is engageable with a driving mechanism for rotationally driving said reel, and said flange portion is provided at its outer peripheral edge portion with a restricting gear (43a) restricting the rotation of said reel;
    a cartridge case (2) rotatably storing said reel therein and including,
        a lower case (2b) having in a bottom portion thereof a driving opening (2c) through which said driving engaging portion of said reel hub is brought in engagement with said driving mechanism,
        an upper case (2a) superimposed on an upper portion of said lower case,
        a reel spring (8) interposed between said upper case and said reel for energizing said reel toward said lower case,
    a reel brake (50, 51) rotatably journaled on said upper case, including a locking gear portion meshingly engageable with said restricting gear of said reel, said locking gear portion being energized in a meshingly engaging direction thereof by a brake spring (12, 13), and
    a lid (30) mounted openably and closably in a magnetic tape pull-out opening formed in said cartridge case for pulling out said magnetic tape, said lid being energized in a closing direction thereof by a lid spring (15) having a lid engaging portion (15a), and
the magnetic tape cartridge assembling method comprising the steps of:
    sequentially delivering a pallet (200) on which said upper case is placed within a plurality of assembling stations, which are respectively arranged in a straight line manner and each of which includes an assembling robot (130) for assembling respective parts of said magnetic tape cartridge,
    wherein said pallet comprises:
        a reel brake hold mechanism (210, 220) capable of holding said locking gear portion of said reel brake (50, 51) against an energizing force of said brake spring in such a manner that said reel brake retreats from an installation area of said reel,
        a lid spring hold mechanism (230) capable of holding said lid engaging portion (15a) of said lid spring (15) in such a manner that said lid engaging portion (15a) is not in engagement with said lid (30), and
        a reel hold mechanism (240) capable of holding said reel (3) on said upper case side against an energizing force of said reel spring (8); and
    driving a drive mechanism which is provided in each of said assembling stations and drives at least one of said reel brake hold mechanism, said lid spring hold mechanism and said reel hold mechanism, to thereby assemble respective parts of said magnetic tape cartridge onto said upper case by said respective assembling robots.

2. Apparatus for assembling a magnetic tape cartridge, the magnetic tape cartridge comprising:
    a reel (3) including a reel hub (42) around which a magnetic tape is wound and a flange portion (43) projected in a radial direction of said reel from an outer periphery of an upper portion of said reel hub, wherein said reel hub (42) is provided at its bottom portion with a driving engaging portion which is engageable with a driving mechanism for rotationally driving said reel, and said flange portion is provided at its outer peripheral edge portion with a restricting gear (43a) restricting the rotation of said reel;
    a cartridge case (2) rotatably storing said reel therein and including,
        a lower case (2b) having in the bottom portion thereof a driving opening (2c) through which said driving engaging portion of said reel hub is brought in engagement with said driving mechanism,
        an upper case (2a) superimposed on an upper portion of said lower case,
        a reel spring (8) interposed between said upper case and said reel for energizing said reel toward said lower case,
    a reel brake (50, 51) rotatably journaled on said upper case, including a locking gear portion meshingly engageable with said restricting gear of said reel, said locking gear portion, being energized in a meshingly engaging direction thereof by a brake spring (12, 13), and a lid (30) mounted openably and closably in a magnetic tape pull-out opening formed in said cartridge case for pulling out said magnetic tape, said lid being energized in a closing direction thereof by a lid spring (15) having a lid engaging portion (15a), and the magnetic tape cartridge assembling apparatus comprising:

a pallet (200) placing said upper case thereon and sequentially delivered within a plurality of assembling stations, wherein said pallet comprises:

a reel brake hold mechanism (210, 220) capable of holding said locking gear portion of said reel brake (50, 51) against an energizing force of said brake spring in such a manner that said reel brake retreats from an installation area of said reel, a lid spring hold mechanism (230) capable of holding said lid engaging portion (15a) of said lid spring (15) in such a manner that said lid engaging portion (15a) is not in engagement with said lid (30), and a reel hold mechanism (240) capable of holding said reel (3) on said upper case side against an energizing force of said reel spring (8); and wherein said assembling stations are respectively arranged in a straight line manner and each of which includes, an assembling robot (130) for assembling a respective part of said magnetic tape cartridge, and a drive mechanism for driving at least one of said reel brake hold mechanism, said lid spring hold mechanism and said reel hold mechanism, to thereby assemble the respective parts of said magnetic tape cartridge onto said upper case by said respective assembling robots.

3. The apparatus according to claim 2, wherein said reel brake of said magnetic tape cartridge comprises front and rear reel brakes (50, 51), and said reel brake hold mechanism comprises front and rear reel brake holding mechanisms (210, 220), wherein reel brake hold forces of said front and rear reel brake holding mechanism move said upper case on said pallet in a substantially common direction (Y1).

4. The apparatus according to claim 2, wherein said pallet further comprises a lower case hold mechanism (250) located beside said reel hold mechanism.

* * * * *